US012117997B2

(12) United States Patent
Reynolds et al.

(10) Patent No.: US 12,117,997 B2
(45) Date of Patent: *Oct. 15, 2024

(54) AUXILIARY QUERY COMMANDS TO DEPLOY PREDICTIVE DATA MODELS FOR QUERIES IN A NETWORKED COMPUTING PLATFORM

(71) Applicant: data.world, Inc., Austin, TX (US)

(72) Inventors: Shad William Reynolds, Austin, TX (US); David Lee Griffith, Austin, TX (US); Bryon Kristen Jacob, Austin, TX (US)

(73) Assignee: data.world, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,077

(22) Filed: May 9, 2022

(65) Prior Publication Data
US 2023/0359615 A1 Nov. 9, 2023

Related U.S. Application Data

(63) Continuation of application No. 16/899,549, filed on Jun. 11, 2020, now Pat. No. 11,327,991, which is a
(Continued)

(51) Int. Cl.
*G06F 16/242* (2019.01)
*G06F 16/2455* (2019.01)
(Continued)

(52) U.S. Cl.
CPC .... *G06F 16/2445* (2019.01); *G06F 16/24553* (2019.01); *G06F 16/248* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 5,845,285 A | 12/1998 | Klein | |
| 6,144,962 A | 11/2000 | Weinberg et al. | |

(Continued)

FOREIGN PATENT DOCUMENTS

| | | |
|---|---|---|
| AU | 2012289936 A1 | 2/2014 |
| CA | 2820994 A1 | 1/2014 |

(Continued)

OTHER PUBLICATIONS

"Data.World Comes Out Of Stealth To Make Open Data Easier." Americaninno.com, AustinInno, Jul. 11, 2016, Retrieved from the Internet; URL: www.americaninno.com/austin/open-data-tech-brett-hurts-startup-data-world-launches/ [retrieved Jan. 27, 2020].

(Continued)

*Primary Examiner* — Dawaune A Conyers
(74) *Attorney, Agent, or Firm* — KOKKA & BACKUS, PC

(57) ABSTRACT

Various embodiments relate generally to data science and data analysis, computer software and systems, and network communications to interface among repositories of disparate datasets and computing machine-based entities configured to access datasets, and, more specifically, to a computing and data storage platform configured to provide one or more computerized tools to deploy predictive data models based on in-situ auxiliary query commands implemented in a query, and configured to facilitate development and management of data projects by providing an interactive, project-centric workspace interface coupled to collaborative computing devices and user accounts. For example, a method may include activating a query engine, implementing a subset of auxiliary instructions, at least one auxiliary instruction being configured to access model data, receiving a query that causes the query engine to access the model data, receiving serialized model data, performing a function (Continued)

associated with the serialized model data, and generating resultant data.

18 Claims, 8 Drawing Sheets

Related U.S. Application Data continuation-in-part of application No. 15/985,705, filed on May 22, 2018, now Pat. No. 11,086,896.

(51) Int. Cl.
*G06F 16/248* (2019.01)
*G06F 16/25* (2019.01)

(56) References Cited

U.S. PATENT DOCUMENTS

| | | |
|---|---|---|
| 6,317,752 B1 | 11/2001 | Lee et al. |
| 6,529,909 B1 | 3/2003 | Bowman-Amuah |
| 6,768,986 B2 | 7/2004 | Cras et al. |
| 6,961,728 B2 | 11/2005 | Wynblatt et al. |
| 7,080,090 B2 | 7/2006 | Shah et al. |
| 7,143,046 B2 | 11/2006 | Babu et al. |
| 7,146,375 B2 | 12/2006 | Egilsson et al. |
| 7,680,862 B2 | 3/2010 | Chong et al. |
| 7,702,639 B2 | 4/2010 | Stanley et al. |
| 7,761,407 B1 | 7/2010 | Stern |
| 7,818,352 B2 | 10/2010 | Krishnamoorthy et al. |
| 7,836,063 B2 | 11/2010 | Salazar et al. |
| 7,853,081 B2 | 12/2010 | Thint |
| 7,856,416 B2 | 12/2010 | Hoffman et al. |
| 7,877,350 B2 | 1/2011 | Stanfill et al. |
| 7,953,695 B2 | 5/2011 | Roller et al. |
| 7,987,179 B2 | 7/2011 | Ma et al. |
| 8,037,108 B1 | 10/2011 | Chang |
| 8,060,472 B2 | 11/2011 | Itai et al. |
| 8,099,382 B2 | 1/2012 | Liu et al. |
| 8,170,981 B1 | 5/2012 | Tewksbary |
| 8,275,784 B2 | 9/2012 | Cao et al. |
| 8,296,200 B2 | 10/2012 | Mangipudi et al. |
| 8,312,389 B2 | 11/2012 | Crawford et al. |
| 8,429,179 B1 | 4/2013 | Mirhaji |
| 8,521,565 B2 | 8/2013 | Faulkner et al. |
| 8,538,985 B2 | 9/2013 | Betawadkar-Norwood et al. |
| 8,583,631 B1 | 11/2013 | Ganapathi et al. |
| 8,616,443 B2 | 12/2013 | Butt et al. |
| 8,640,056 B2 | 1/2014 | Helfman et al. |
| 8,719,252 B2 | 5/2014 | Miranker et al. |
| 8,762,160 B2 | 6/2014 | Lulla |
| 8,799,240 B2 | 8/2014 | Stowe et al. |
| 8,831,070 B2 | 9/2014 | Huang et al. |
| 8,843,502 B2 | 9/2014 | Elson et al. |
| 8,856,643 B2 | 10/2014 | Drieschner |
| 8,892,513 B2 | 11/2014 | Forsythe |
| 8,935,272 B2 | 1/2015 | Ganti et al. |
| 8,943,313 B2 | 1/2015 | Glew et al. |
| 8,965,915 B2 | 2/2015 | Ganti et al. |
| 8,990,236 B2 | 3/2015 | Mizrahy et al. |
| 8,996,559 B2 | 3/2015 | Ganti et al. |
| 8,996,978 B2 | 3/2015 | Richstein et al. |
| 9,002,860 B1 | 4/2015 | Ghemawat |
| 9,171,077 B2 | 10/2015 | Balmin et al. |
| 9,218,365 B2 | 12/2015 | Irani et al. |
| 9,244,952 B2 | 1/2016 | Ganti et al. |
| 9,268,820 B2 | 2/2016 | Henry |
| 9,268,950 B2 | 2/2016 | Gkoulalas-Divanis et al. |
| 9,396,283 B2 | 7/2016 | Miranker et al. |
| 9,454,611 B2 | 9/2016 | Henry |
| 9,495,429 B2 | 11/2016 | Miranker |
| 9,560,026 B1 | 1/2017 | Worsley |
| 9,607,042 B2 | 3/2017 | Long |
| 9,613,152 B2 | 4/2017 | Kucera |
| 9,659,081 B1 | 5/2017 | Ghodsi et al. |
| 9,690,792 B2 | 6/2017 | Bartlett et al. |
| 9,696,981 B2 | 7/2017 | Martin et al. |
| 9,710,526 B2 | 7/2017 | Couris et al. |
| 9,710,568 B2 | 7/2017 | Srinivasan et al. |
| 9,720,958 B2 | 8/2017 | Bagehorn et al. |
| 9,760,602 B1 | 9/2017 | Ghodsi et al. |
| 9,769,032 B1 | 9/2017 | Ghodsi et al. |
| 9,798,737 B2 | 10/2017 | Palmer |
| 9,836,302 B1 | 12/2017 | Hunter et al. |
| 9,959,337 B2 | 5/2018 | Ghodsi et al. |
| 9,990,230 B1 | 6/2018 | Stoica et al. |
| 10,095,735 B2 | 10/2018 | Ghodsi et al. |
| 10,102,258 B2 | 10/2018 | Jacob et al. |
| 10,176,234 B2 | 1/2019 | Gould et al. |
| 10,216,860 B2 | 2/2019 | Miranker et al. |
| 10,248,297 B2 | 4/2019 | Beechuk et al. |
| 10,296,329 B2 | 5/2019 | Hunter et al. |
| 10,318,567 B2 | 6/2019 | Henry |
| 10,324,925 B2 | 6/2019 | Jacob et al. |
| 10,346,429 B2 | 7/2019 | Jacob et al. |
| 10,353,911 B2 | 7/2019 | Reynolds et al. |
| 10,361,928 B2 | 7/2019 | Ghodsi et al. |
| 10,438,013 B2 | 10/2019 | Jacob et al. |
| 10,452,677 B2 | 10/2019 | Jacob et al. |
| 10,452,975 B2 | 10/2019 | Jacob et al. |
| 10,474,501 B2 | 11/2019 | Ghodsi et al. |
| 10,474,736 B1 | 11/2019 | Stoica et al. |
| 10,545,986 B2 | 1/2020 | Tappan et al. |
| 10,546,001 B1 | 1/2020 | Nguyen et al. |
| D876,454 S | 2/2020 | Knowles et al. |
| 10,558,664 B2 | 2/2020 | Armbrust et al. |
| D877,167 S | 3/2020 | Knowles et al. |
| D879,112 S | 3/2020 | Hejazi et al. |
| 10,606,675 B1 | 3/2020 | Luszczak et al. |
| 10,645,548 B2 | 5/2020 | Reynolds et al. |
| 10,664,509 B1 | 5/2020 | Reeves et al. |
| 10,673,887 B2 | 6/2020 | Crabtree et al. |
| 10,678,536 B2 | 6/2020 | Hunter et al. |
| 10,691,299 B2 | 6/2020 | Broek et al. |
| 10,691,433 B2 | 6/2020 | Shankar et al. |
| 10,713,314 B2 | 7/2020 | Yan et al. |
| 10,769,130 B1 | 9/2020 | Armbrust et al. |
| 10,769,535 B2 | 9/2020 | Lindsley |
| 10,810,051 B1 | 10/2020 | Shankar et al. |
| 10,922,308 B2 | 2/2021 | Griffith |
| 10,984,008 B2 | 4/2021 | Jacob et al. |
| 11,042,556 B2 | 6/2021 | Griffith et al. |
| 11,042,560 B2 | 6/2021 | Griffith et al. |
| 11,068,453 B2 | 7/2021 | Griffith |
| 11,068,475 B2 | 7/2021 | Boutros et al. |
| 11,068,847 B2 | 7/2021 | Boutros et al. |
| 11,093,539 B2 | 8/2021 | Henry |
| 11,294,972 B2 | 4/2022 | George et al. |
| 11,327,991 B2 | 5/2022 | Reynolds et al. |
| 11,468,049 B2 | 10/2022 | Griffith et al. |
| 11,500,831 B2 | 11/2022 | Griffith et al. |
| 2002/0133476 A1 | 9/2002 | Reinhardt |
| 2002/0143755 A1 | 10/2002 | Wynblatt et al. |
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |
| 2006/0100995 A1 | 5/2006 | Albornoz et al. |
| 2006/0117057 A1 | 6/2006 | Legault et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0055662 A1 | 3/2007 | Edelman et al. |
| 2007/0139227 A1 | 6/2007 | Speirs et al. |
| 2007/0179760 A1 | 8/2007 | Smith |
| 2007/0203933 A1 | 8/2007 | Iversen et al. |

(56) References Cited

U.S. PATENT DOCUMENTS

| | | |
|---|---|---|
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 | 6/2008 | Werner et al. |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0094416 A1 | 4/2009 | Baeza-Yates et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0248714 A1 | 10/2009 | Liu |
| 2009/0300054 A1 | 12/2009 | Fisher et al. |
| 2010/0114885 A1 | 5/2010 | Bowers et al. |
| 2010/0138388 A1 | 6/2010 | Wakeling et al. |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0190386 A1 | 7/2012 | Anderson |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0110825 A1 | 5/2013 | Henry |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0318070 A1 | 11/2013 | Wu et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0113638 A1 | 4/2014 | Zhang et al. |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280192 A1* | 9/2014 | Cronin ............... G06F 16/2455 707/741 |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0066387 A1 | 3/2015 | Yamada et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0092527 A1 | 3/2016 | Kang et al. |
| 2016/0098418 A1 | 4/2016 | Dakshinamurthy et al. |
| 2016/0100009 A1 | 4/2016 | Zoldi et al. |
| 2016/0103908 A1 | 4/2016 | Fletcher et al. |
| 2016/0117358 A1 | 4/2016 | Schmid et al. |
| 2016/0117362 A1 | 4/2016 | Bagehorn et al. |
| 2016/0125057 A1 | 5/2016 | Gould et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0210364 A1 | 7/2016 | Henry |
| 2016/0225271 A1 | 8/2016 | Robichaud et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0350414 A1 | 12/2016 | Henry |
| 2016/0352592 A1 | 12/2016 | Sasaki et al. |
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |

(56) References Cited

U.S. PATENT DOCUMENTS

| | | |
|---|---|---|
| 2017/0017537 A1 | 1/2017 | Razin et al. |
| 2017/0032259 A1 | 2/2017 | Goranson et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0318020 A1 | 11/2017 | Kamath et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0031703 A1 | 2/2018 | Ngai et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0075115 A1 | 3/2018 | Murray et al. |
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0138538 A1 | 5/2019 | Stojanovic et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0278793 A1 | 9/2019 | Henry |
| 2019/0286617 A1 | 9/2019 | Abu-Abed et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2019/0384571 A1 | 12/2019 | Oberbreckling et al. |
| 2020/0005356 A1* | 1/2020 | Greenberger ..... H04M 1/72457 |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0097812 A1* | 3/2020 | Csar .......................... G06N 3/08 |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0380009 A1 | 12/2020 | Reynolds et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0117445 A1* | 4/2021 | Guo ....................... G06F 16/256 |
| 2021/0173848 A1 | 6/2021 | Jacob et al. |
| 2021/0224250 A1 | 7/2021 | Griffith |
| 2021/0224330 A1 | 7/2021 | Miranker et al. |
| 2021/0294465 A1 | 9/2021 | Reynolds et al. |
| 2021/0374134 A1 | 12/2021 | He et al. |
| 2021/0374171 A1 | 12/2021 | Henry |
| 2021/0374555 A1 | 12/2021 | Beguerisse-Díaz et al. |
| 2021/0390098 A1 | 12/2021 | Reynolds et al. |
| 2021/0390141 A1 | 12/2021 | Jacob et al. |
| 2021/0390507 A1 | 12/2021 | Reynolds et al. |
| 2021/0397589 A1 | 12/2021 | Griffith et al. |
| 2021/0397611 A1 | 12/2021 | Boutres et al. |
| 2021/0397626 A1 | 12/2021 | Griffith et al. |
| 2022/0229838 A1 | 7/2022 | Jacob et al. |
| 2022/0229847 A1 | 7/2022 | Jacob et al. |
| 2022/0261411 A1 | 8/2022 | Reynolds et al. |
| 2022/0277004 A1 | 9/2022 | Griffith et al. |
| 2022/0327119 A1 | 10/2022 | Gasper et al. |
| 2022/0337978 A1 | 10/2022 | Reynolds et al. |
| 2023/0252297 A1* | 8/2023 | Chu ....................... G06F 16/285 |
| | | 706/25 |

FOREIGN PATENT DOCUMENTS

| | | |
|---|---|---|
| CN | 103425734 B | 6/2017 |
| EP | 2631817 A1 | 8/2013 |
| EP | 2631819 A1 | 8/2013 |
| EP | 2685394 A3 | 6/2017 |
| EP | 2740053 B1 | 6/2019 |
| GB | 2519779 A | 5/2015 |
| JP | 2013175181 A | 9/2013 |
| JP | 2013246828 A | 12/2013 |
| JP | 2014524124 A | 9/2014 |
| WO | 2012054860 A1 | 4/2012 |
| WO | 2013020084 A1 | 2/2013 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |
| WO | 2021252805 A1 | 12/2021 |

OTHER PUBLICATIONS

Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1--1-5.pdf. Retrieved on Oct. 6, 2020.

Angles, R., Gutierrez. C., "The Expressive Power of SPARQL,"

(56) References Cited

OTHER PUBLICATIONS

Proceedings of the 7th International Semantic Web Conference (ISWC2008). 2008.
Arenas, M., et al., "A Direct Mapping of Relational Data to RDF," W3C Recommendation, Sep. 27, 2012, Retrieved from the Internet; URL: https://www.w3.org/TR/rdb-direct-mapping/ [retrieved Mar. 7, 2019].
Beckett, D., Berners-Lee, T., "Turtle-Terse RDF Triple Language," W3C Team Submission, Jan. 14, 2008, Retrieved from the Internet URL: https://www.w3.org/TeamSubmission/2008/SUBM-turtle-20080114/ [retrieved Mar. 7, 2019].
Beckett, D., Broekstra, J., "SPARQL Query Results XML Format," W3C Recommendation, Jan. 15, 2008, Retrieved from the Internet URL: https://www.w3.org/TR/2008/REC-rdf-sparql/XMLres-20080115/ [retrieved Mar. 7, 2019].
Beckett, Dave, "RDF/XML Syntax Specification (Revised)," W3C Recommendation, Feb. 10, 2004, Retrieved from the Internet; URL: https://www.w3.org/TR/2004/REC-rdf-syntax-grammar-20040210/ [retrieved Mar. 7, 2019].
Berners-Lee, Tim, "Notation 3," 2006, Retrieved from the Internet; URL: https://www.w3.org/DesignIssues/Notation3.html [retrieved on Mar. 7, 2019].
Berners-Lee, Tim, "Linked Data," 2009, Retrieved from the Internet; URL: https://www.w3.org/DesignIssues/LinkedData.html [retrieved on Mar. 7, 2019].
Boutros et al., "Computerized Tools to Develop and Manage Data-Driven Projects Collaboratively via a Networked Computing Platform and Collaborative Datasets," U.S. Appl. No. 15/985,702, filed May 22, 2018.
Boutros et al., "Computerized Tools to Facilitate Data Project Development via Data Access Layering Logic in a Networked Computing Platform Including Collaborative Datasets," U.S. Appl. No. 15/985,704, filed May 22, 2018.
Boutros et al., "Dynamic Composite Data Dictionary to Facilitate Data Operations via Computerized Tools Configured to Access Collaborative Datasets in a Networked Computing Platform," U.S. Appl. No. 15/985,705, filed May 22, 2018.
Boutros et al., "Graphical User Interface for a Display Screen or Portion Thereof," U.S. Appl. No. 29/648,465, filed May 22, 2018.
Boutros et al., "Graphical User Interface for a Display Screen or Portion Thereof," U.S. Appl. No. 29/648,466, filed May 22, 2018.
Boutros et al., "Graphical User Interface for a Display Screen or Portion Thereof," U.S. Appl. No. 29/648,467, filed May 22, 2018.
Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.
Brickley, D., Guha, R.V., "RDF Vocabulary Description Language 1.0: RDF Schema," W3C Recommendation, Feb. 10, 2004, Retrieved from the Internet; URL: https://www.w3.org/TR/2004/REC-rdf-schema-2004/0210/ [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action mailed Jan. 22, 2019 for U.S. Appl. No. 15/439,908.
Bullock, Joshua, Final Office Action mailed Jan. 22, 2019 for U.S. Appl. No. 15/439,911.
Bullock, Joshua, Final Office Action mailed Oct. 30, 2018 for U.S. Appl. No. 15/186,517.
Bullock, Joshua, Non-Final Office Action mailed Dec. 20, 2021 for U.S. Appl. No. 16/457,759.
Bullock, Joshua, Non-Final Office Action mailed Dec. 7, 2021 for U.S. Appl. No. 16/457,750.
Bullock, Joshua, Non-Final Office Action mailed Jul. 12, 2018 for U.S. Appl. No. 15/186,517.
Bullock, Joshua, Non-Final Office Action mailed Jun. 28, 2018 for U.S. Appl. No. 15/439,908.
Bullock, Joshua, Non-Final Office Action mailed Jun. 28, 2018 for U.S. Appl. No. 15/439,911.
Bullock, Joshua, Notice of Allowance and Fee(s) Due mailed Dec. 22, 2021 for U.S. Appl. No. 16/395,049.
Bullock, Joshua, Notice of Allowance and Fee(s) Due mailed Feb. 23, 2022 for U.S. Appl. No. 16/457,750.
Caiado, Antonio J., Non-Final Office Action mailed Sep. 16, 2022 for U.S. Appl. No. 17/365,214.
Clark, K., Feigenbaum, L., Torres, E., "SPARQL Protocol for RDF," W3C Recommendation, Jan. 15, 2008, Retrieved from the Internet; URL: https://www.w3.org/TR/2008/REC-rdf-sparql-protocol-20080115/ [retrieved Mar. 7, 2019].
Copenheaver, Blaine R., Notification of Transmittal of the International Search Report and the Written Opinion of the International Searching Authority, or the Declaration mailed Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet; URL: https://www.w3.org/TR/2004/REC-owl-ref-20040210/ [retrieved Mar. 7, 2019].
Doung, Hien, Non-Final Office Action mailed Dec. 9, 2020 for U.S. Appl. No. 16/899,544.
Duong, Hien Luongvan, Non-Final Office Action mailed May 5, 2022 for U.S. Appl. No. 17/185,917.
Duong, Hien, Notice of Allowance and Fee(s) Due mailed Oct. 27, 2022 for U.S. Appl. No. 17/185,917.
Dwivedi, Mahesh H., Non-Final Office Action mailed Jan. 30, 2020 for U.S. Appl. No. 15/454,955.
Ellis, Matthew J., Non-Final Office Action mailed Sep. 25, 2020 for U.S. Appl. No. 16/139,374.
European Patent Office, Extended European Search Report for European Patent Application No. 18757122.9 mailed Oct. 15, 2020.
European Patent Office, Extended European Search Report for European Patent Application No. 18763855.6 mailed Sep. 28, 2020.
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Auto-Completion of Queries With Data Object Names and Data Profiles."
Garay, Peter, Examination Report No. 1 for Standard Patent Application for Australia Patent Application No. 2017282656 mailed Jul. 21, 2021, Intellectual Property Office of Australia.
Garcia-Molina, H., Ullman, J., Widom, J., Database Systems: The Complete Book. Editorial Pearson Prentice Hall. Second Edition. Published Jan. 11, 2011. (Year: 2011).
Gawinecki, Maciej, "How schema mapping can help in data integration?—integrating the relational databases with ontologies," ITC School, Computer Science, XXIII Cycle DII, University of Modena and Reggio Emilia, Italy, 2008.
Gillin, Paul, "Neo4j Connector Integrates Graph Data With Business Intelligence Tools," SiliconANGLE, Published Mar. 24, 2020, Retrieved from https://siliconangle.com/2020/03/24/neo4j-connector-integrates-graph-data-business-intelligence-tools/ on Mar. 25, 2020.
Girma, Anteneh B., Final Office Action for U.S. Appl. No. 13/278,907, mailed Apr. 18, 2013.
Girma, Anteneh B., Non-Final Office Action for U.S. Appl. No. 13/278,907, mailed Jul. 25, 2012.
Grant, J., Beckett, D., "RDF Test Cases," W3C Recommendation, Feb. 10, 2004, Retrieved from the Internet; URL: https://www.w3.org/TR/2004/REC-rdf-testcases-20040210/ [retrieved Mar. 7, 2019].

(56) References Cited

OTHER PUBLICATIONS

Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion to Generate Layered Dataset Interrelations to Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Layered Data Generation and Data Remediation to Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith et al., "Transmuting Data Associations Among Data Arrangements to Facilitate Data Operations in a System of Networked Collaborative Datasets," U.S. Appl. No. 15/943,629, filed Apr. 2, 2018.
Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.
Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet; URL: https://www.w3.org/TR/2004/REC-rdf-mt-20040210/ [retrieved Mar. 7, 2019].
Heflin, J., "OWL Web Ontology Language Use Cases and Requirements," W3C Recommendation, Feb. 10, 2004, Retrieved from the Internet; URL: https://www.w3.org/TR/2004/REC-webnot-req-20040210 [retrieved Mar. 7, 2019].
Henry, Jerome William, U.S. Appl. No. 61/515,305, filed Aug. 4, 2011 entitled, "Apparatus and Method for Supplying Search Results With a Knowledge Card."
Hoang, Hau Hai, Final Office Action mailed Jul. 30, 2019 for U.S. Appl. No. 15/186,515.
Hoang, Hau Hai, Final Office Action mailed Nov. 26, 2018 for U.S. Appl. No. 15/186,515.
Hoang, Hau Hai, Non-Final Office Action mailed Apr. 16, 2019 for U.S. Appl. No. 15/186,515.
Hoang, Hau Hai, Non-Final Office Action mailed May 3, 2018 for U.S. Appl. No. 15/186,515.
Hoang, Hau Hai, Notice of Allowance and Fee(s) Due mailed Aug. 19, 2021 for U.S. Appl. No. 16/697,132.
Htay, Lin Lin M., Non-Final Office Action mailed Sep. 14, 2018 for U.S. Appl. No. 15/186,516.
Htay, Lin Lin M., Notice of Allowance and Fee(s) Due and Notice of Allowability for U.S. Appl. No. 15/186,516, mailed Jan. 25, 2019.
Hu, Xiaoqin, Final Office Action mailed Apr. 5, 2019 for U.S. Appl. No. 15/454,969.
Hu, Xiaoqin, Final Office Action mailed Apr. 5, 2019 for U.S. Appl. No. 15/454,981.
Hu, Xiaoqin, Final Office Action mailed Oct. 31, 2019 for U.S. Appl. No. 15/454,969.
Hu, Xiaoqin, Final Office Action mailed Sep. 24, 2019 for U.S. Appl. No. 15/454,981.
Hu, Xiaoqin, Non-Final Office Action for U.S. Appl. No. 15/454,969 mailed Dec. 7, 2018.
Hu, Xiaoqin, Non-Final Office Action for U.S. Appl. No. 15/454,981 mailed Dec. 12, 2018.
Hu, Xiaoqin, Non-Final Office Action mailed Aug. 1, 2019 for U.S. Appl. No. 15/454,981.
Hu, Xiaoqin, Non-Final Office Action mailed Jul. 26, 2019 for U.S. Appl. No. 15/454, 969.
Hu, Xiaoqin, Non-Final Office Action mailed Jul. 30, 2021 for U.S. Appl. No. 16/732,261.
Hu, Xiaoqin, Non-Final Office Action mailed Sep. 2, 2021 for U.S. Appl. No. 16/732,263.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation via Distributed Computer Networks," U.S. Appl. No. 16/120,057, filed Aug. 31, 2018.
Jacob et al., "Collaborative Dataset Consolidation via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/271,263, filed Feb. 8, 2019.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, mailed Jun. 14, 2018.
Kim, Harry C., Notification of Transmittal of the International Search Report and the Written Opinion of the International Searching Authority, or the Declaration, mailed Sep. 28, 2021 for International Application No. PCT/US2021/036880.
Klyne, G., Carroll, J., "Resource Description Framework (RDF): Concepts and Abstract Syntax," W3C Recommendation, Feb. 10, 2004, Retrieved from the Internet; URL: https://www.w3.org/TR/2004/REC-rdf-concepts-20040210 [retrieved Mar. 7, 2019].
Konda et al., Magellan: Toward Building Entity Matching Management Systems over Data Science Stacks, Proceedings of the VLDB Endowment, vol. 9, No. 13, (2016), pp. 1581-1584; URL: http://cpcp.wisc.edu/images/resources/magellan-vldb16.pdf, Date retrieved: Aug. 30, 2021.
Konda, Pradap, Magellan: Toward Building Entity Matching Management Systems, Presentation dated Feb. 27, 2018.
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet URL: http://xlwrap.sourceforge.net [retrieved Mar. 7, 2019].
Lee, Mark B., Non-Final Office Action for U.S. Appl. No. 13/180,444 mailed Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet; URL: https://www.w3.org/TR/2004/REC-rdf-primer-20040210/ [retrieved Mar. 7, 2019].
Martin et al., U.S. Appl. No. 13/457,925, filed Apr. 27, 2012 and titled "Incremental Deployment of Computer Software Program Logic."

(56) References Cited

OTHER PUBLICATIONS

Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet; URL: https://www.w3.org/TR/2004/REC-owl-features-20040210/ [retrieved Mar. 7, 2019].
Mian, Muhammad U., Notice of Allowance and Fee(s) Due mailed Jun. 6, 2022 for U.S. Appl. No. 17/246,359.
Mian, Umar, Non-Final Office Action mailed Apr. 8, 2022 for U.S. Appl. No. 17/246,359.
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet; URL: https://www.ncbi.nlm.nih.gov/ [retrieved Mar. 7, 2019].
Nguyen, Bao-Yen Thi, Restriction Requirement mailed Jun. 29, 2021 for Design U.S. Appl. No. 29/648,466.
Nguyen, Kim T., Non-Final Office Action mailed Apr. 25, 2022 for U.S. Appl. No. 17/163,287.
Nguyen, Kim T., Non-Final Office Action mailed Aug. 31, 2021 for U.S. Appl. No. 16/899,549.
Nguyen, Kim T., Non-Final Office Action mailed Aug. 31, 2022 for U.S. Appl. No. 17/332,354.
Nguyen, Kim T., Non-Final Office Action mailed Aug. 31, 2022 for U.S. Appl. No. 17/333,914.
Nguyen, Kim T., Non-Final Office Action mailed Dec. 10, 2020 for U.S. Appl. No. 16/137,297.
Nguyen, Kim T., Non-Final Office Action mailed Dec. 8, 2020 for U.S. Appl. No. 15/985,704.
Nguyen, Kim T., Non-Final Office Action mailed Jun. 14, 2018 for U.S. Appl. No. 15/186,514.
Nguyen, Kim T., Non-Final Office Action mailed Jun. 7, 2021 for U.S. Appl. No. 16/457,766.
Nguyen, Kim T., Non-Final Office Action mailed Mar. 20, 2019 for U.S. Appl. No. 15/454,923.
Nguyen, Kim T., Non-Final Office Action mailed May 11, 2021 for U.S. Appl. No. 16/395,036.
Nguyen, Kim T., Non-Final Office Action mailed Nov. 24, 2020 for U.S. Appl. No. 16/036,834.
Nguyen, Kim T., Non-Final Office Action mailed Nov. 24, 2020 for U.S. Appl. No. 16/036,836.
Nguyen, Kim T., Non-Final Office Action mailed Nov. 27, 2020 for U.S. Appl. No. 15/985,705.
Nguyen, Kim T., Non-Final Office Action mailed Oct. 14, 2020 for U.S. Appl. No. 15/943,629.
Nguyen, Kim T., Non-Final Office Action mailed Oct. 14, 2020 for U.S. Appl. No. 15/943,633.
Nguyen, Kim T., Non-Final Office Action mailed Oct. 27, 2020 for U.S. Appl. No. 15/985,702.
Nguyen, Kim T., Non-Final Office Action mailed Oct. 5, 2020 for U.S. Appl. No. 15/927,004.
Nguyen, Kim T., Non-Final Office Action mailed Oct. 5, 2020 for U.S. Appl. No. 15/927,006.
Nguyen, Kim T., Non-Final Office Action mailed Sep. 21, 2020 for U.S. Appl. No. 15/926,999.
Nguyen, Kim T., Notice of Allowance and Fee(s) Due mailed Nov. 21, 2022 for U.S. Appl. No. 17/332,354.
Nguyen, Kim T., Notice of Allowance and Fee(s) Due mailed Apr. 14, 2022 for U.S. Appl. No. 17/037,005.
Nguyen, Kim T., Notice of Allowance and Fee(s) Due mailed Aug. 17, 2021 for U.S. Appl. No. 16/428,915.
Nguyen, Kim T., Notice of Allowance and Fee(s) Due mailed Sep. 28, 2022 for U.S. Appl. No. 17/163,287.
Nguyen, Kim T., Notice of Allowance and Fee(s) Due, mailed May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Noy et al., "Tracking Changes During Ontology Evolution." International Semantic Web Conference. Springer, Berlin, Heidelberg, 2004 (Year: 2004).
Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Patel-Schneider, P., Hayes, P., Horrocks, I., "OWL Web Ontology Language Semantics and Abstract Syntax," W3C Recommendation, Feb. 10, 2004, Retrieved from the Internet; URL: https://www.w3.org/TR/2004/REC-owl-semantics-20040210 [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet; URL: https://www.w3.org/TR/2008/REC-rdf-sparql-query-20080115/ [retrieved Mar. 7, 2019].
Raab, Christopher J., Non-Final Office Action mailed Jul. 24, 2020 for U.S. Appl. No. 16/271,687.
Raab, Christopher J., Non-Final Office Action mailed Jun. 28, 2018 for U.S. Appl. No. 15/186,520.
Raab, Christopher J., Non-Final Office Action mailed Oct. 16, 2020 for U.S. Appl. No. 16/287,967.
Raab, Christopher J., Notice of Allowance and Fee(s) Due and Notice of Allowability for U.S. Appl. No. 15/186,520, mailed Jan. 2, 2019.
Rachapalli et al., "Retro: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
RDB2RDF Working Group Charter, Sep. 2009, Retrieved from the Internet; URL: https://www.w3.org/2009/08/rdb2rdf-charter [retrieved Mar. 7, 2019].
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed with the Receiving Office of the USPTO on Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.
Sahoo, S., et al., "A Survey of Current Approaches for Mapping of Relational Databases to RDF," W3C RDB2RDF XG Report, Incubator Group, URL: http://www.w3.org/2005/Incubator/rdb2rdf/RDB2RDF_Survey_Report_01082009.pdf; Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.

(56) References Cited

OTHER PUBLICATIONS

Sequeda, J., Tirmizi, S., Miranker, D., "SQL Databases are a Moving Target," Position Paper for W3C Workshop on RDF Access to Relational Databases, Cambridge, MA, USA, 2007.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Slawski, Bill, Google Knowledge Cards Improve Search Engine Experiences, SEO by the Sea, Published Mar. 18, 2015, URL: https://www.seobythesea.com/2015/03/googles-knowledge-cards/, Retrieved Sep. 15, 2021.
Smith, M., Welty, C., McGuiness, D., "OWL Web Ontology Language Guide," W3C Recommendation, Feb. 10, 2004, Retrieved from the Internet; URL: https://www.w3.org/TR/2004/REC-owl-guide-20040210/ [retrieved Mar. 7, 2019].
Smith, T.F., Waterman, M.S., "Identification of Common Molecular Subsequences," J. Mol. Biol. 147, 195-197 (1981).
Spieler, William, Advisory Action mailed Nov. 22, 2021 for U.S. Appl. No. 16/435,196.
Spieler, William, Final Office Action mailed Mar. 15, 2021 for U.S. Appl. No. 16/435,196.
Spieler, William, Non-Final Office Action mailed Dec. 31, 2020 for U.S. Appl. No. 16/435, 196.
Spieler, William, Non-Final Office Action mailed Feb. 25, 2021 for U.S. Appl. No. 16/558,076.
Spieler, William, Non-Final Office Action mailed Jul. 9, 2021 for U.S. Appl. No. 16/435, 196.
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Uddin, MD I, Non-Final Office Action mailed May 13, 2021 for U.S. Appl. No. 16/404,113.
Uddin, MD I., Final Office Action mailed Jan. 1, 2021 for U.S. Appl. No. 16/404,113.
Uddin, MD I., Non-Final Office Action mailed Oct. 6, 2020 for U.S. Appl. No. 16/404,113.
Ultrawrap Mapper, U.S. Appl. No. 62/169,268, filed Jun. 1, 2015 (Expired).
Vu, Bai Duc, Notice of Allowance and Fee(s) Due mailed Aug. 22, 2022 for U.S. Appl. No. 16/899,551.
Vy, Hung T., Final Office Action for U.S. Appl. No. 13/180,444 mailed Dec. 3, 2014.
Vy, Hung T., Final Office Action for U.S. Appl. No. 13/180,444 mailed Dec. 9, 2015.
Vy, Hung T., Final Office Action for U.S. Appl. No. 13/180,444 mailed Feb. 22, 2013.
Vy, Hung T., Non-Final Office Action for U.S. Appl. No. 13/180,444 mailed Jun. 18, 2015.
Vy, Hung T., Non-Final Office Action for U.S. Appl. No. 13/180,444 mailed Mar. 26, 2014.
Yen, Syling, Final Office Action mailed Apr. 10, 2019 for U.S. Appl. No. 15/186,519.
Yen, Syling, Final Office Action mailed Oct. 25, 2019 for U.S. Appl. No. 15/186,519.
Yen, Syling, Non-Final Office Action mailed Feb. 8, 2019 for U.S. Appl. No. 15/186,519.
Yen, Syling, Non-Final Office Action mailed Sep. 12, 2019 for U.S. Appl. No. 15/186,519.
Yotova, Polina, European Patent Office Examination Report, Communication Pursuant to Article 94(3) EPC for European Patent Application No. 17815970.3 mailed Oct. 5, 2021.
Yotova, Polina, Supplementary European Search Report and Examiner Search Opinion for European Patent Application No. 17815970. 3, Feb. 21, 2020.
Young, Lee W., International Searching Authority, Notification of Transmittal of the International Search Report and the Written Opinion of the International Searching Authority, or the Declaration for International Patent Application No. PCT/US2017/037846, mailed Nov. 9, 2017.
Young, Lee W., International Searching Authority, Notification of Transmittal of the International Search Report and the Written Opinion of the International Searching Authority, or the Declaration for International Patent Application No. PCT/US2018/020812, mailed Aug. 8, 2018.
Young, Lee W., Invitation to Pay Additional Fees And, Where Applicable, Protest Fee, Mailed Jun. 14, 2018 for International Application No. PCT/US2018/020812.
Young, Lee W., Notification of Transmittal of the International Search Report and the Written Opinion of the International Searching Authority, or the Declaration mailed May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, mailed Mar. 22, 2012.
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Jacob et al., "Dataset Analysis and Dataset Attribute Inferencing to Form Collaborative Datasets," U.S. Appl. No. 16/292,120, filed Mar. 4, 2019.
Jacob et al., "Management of Collaborative Datasets via Distributed Computer Networks," U.S. Appl. No. 16/271,687, filed Feb. 8, 2019.
Jacob et al., "Management of Collaborative Datasets Via Distributed Computer Networks," U.S. Appl. No. 16/292,135 filed Mar. 4, 2019.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Nguyen, Kim T., Notice of Allowance and Fee(s) Due mailed Aug. 3, 2021 for U.S. Appl. No. 16/457,766.
Nguyen, Kim T., Notice of Allowance and Fee(s) Due mailed Jul. 11, 2022 for U.S. Appl. No. 17/332,368.
Nguyen, Kim T., Notice of Allowance and Fee(s) Due mailed Mar. 16, 2021 for U.S. Appl. No. 15/985,702.
Nguyen, Kim T., Notice of Allowance and Fee(s) Due mailed Mar. 16, 2021 for U.S. Appl. No. 16/137,297.
Nguyen, Kim T., Notice of Allowance and Fee(s) Due mailed Mar. 17, 2021 for U.S. Appl. No. 15/985,704.
Nguyen, Kim T., Notice of Allowance and Fee(s) Due mailed Mar. 31, 2021 for U.S. Appl. No. 15/985,705.
Vy, Hung T., Non-Final Office Action for U.S. Appl. No. 15/273,930 mailed Dec. 20, 2017.
Willis, Amanda Lynn, Final Office Action mailed Apr. 18, 2022 for U.S. Appl. No. 16/899,547.
Willis, Amanda Lynn, Non-Final Office Action mailed Feb. 8, 2022 for U.S. Appl. No. 16/899,547.
Willis, Amanda Lynn, Non-Final Office Action mailed Sep. 8, 2022 for U.S. Appl. No. 16/899,547.
Woo, Isaac M., Non-Final Office Action mailed Jul. 28, 2022 for U.S. Appl. No. 17/004,570.

(56) References Cited

OTHER PUBLICATIONS

Woo, Isaac M., Non-Final Office Action mailed May 5, 2020 for U.S. Appl. No. 16/137,292.

* cited by examiner

AUXILIARY QUERY COMMANDS TO DEPLOY PREDICTIVE DATA MODELS FOR QUERIES IN A NETWORKED COMPUTING PLATFORM

CROSS-REFERENCE TO APPLICATIONS

This application is a continuation application of copending U.S. patent application Ser. No. 16/899,549, filed Jun. 11, 2020 and titled, "AUXILIARY QUERY COMMANDS TO DEPLOY PREDICTIVE DATA MODELS FOR QUERIES IN A NETWORKED COMPUTING PLATFORM," U.S. patent application Ser. No. 16/899,549 is a continuation-in-part application of U.S. patent application Ser. No. 15/985,705, filed on May 22, 2018, now U.S. Pat. No. 11,086,896 and titled "DYNAMIC COMPOSITE DATA DICTIONARY TO FACILITATE DATA OPERATIONS VIA COMPUTERIZED TOOLS CONFIGURED TO ACCESS COLLABORATIVE DATASETS IN A NETWORKED COMPUTING PLATFORM," all of which is herein incorporated by reference in their entirety for all purposes. This application is also related to U.S. Pat. No. 10,346,429, issued on Jul. 9, 2019, and titled "MANAGEMENT OF COLLABORATIVE DATASETS VIA DISTRIBUTED COMPUTER NETWORKS," U.S. Pat. No. 10,353,911, issued on Jul. 16, 2019, and titled "COMPUTERIZED TOOLS TO DISCOVER, FORM, AND ANALYZE DATASET INTERRELATIONS AMONG A SYSTEM OF NETWORKED COLLABORATIVE DATASETS," and U.S. patent application Ser. No. 15/927,006 filed on Mar. 20, 2018, and titled "AGGREGATION OF ANCILLARY DATA ASSOCIATED WITH SOURCE DATA IN A SYSTEM OF NETWORKED COLLABORATIVE DATASETS," all of which are incorporated by reference in their entirety for all purposes.

FIELD

Various embodiments relate generally to data science and data analysis, computer software and systems, and wired and wireless network communications to interface among repositories of disparate datasets and computing machine-based entities configured to access datasets, and, more specifically, to a computing and data storage platform configured to provide one or more computerized tools to deploy predictive data models based on in-situ auxiliary query commands implemented in a query, and configured to facilitate development and management of data projects by providing an interactive, project-centric workspace interface coupled to collaborative computing devices and user accounts.

BACKGROUND

Advances in computing hardware and software have fueled exponential growth in the generation of vast amounts of data due to increased computations and analyses in numerous areas, such as in the various scientific and engineering disciplines. Also, advances in conventional data storage technologies provide an ability to store an increasing amounts of generated data. Moreover, different computing platforms and systems, different database technologies, and different data formats give rise to "data silos" that inherently segregate and isolate datasets.

While conventional approaches are functional, various approaches are not well-suited to significantly overcome the difficulties of data silos. Organizations, including enterprises, continue strive to understand, manage, and productively use large amounts of enterprise data. For example, consumers of enterprise organizations have different levels of skill and experience in using analytic data tools. Data scientists typically create complex data models using sophisticated analysis application tools, whereas other individuals, such as executives, marketing personnel, product managers, etc., have varying levels of skill, roles, and responsibilities in an organization. The disparities in various analytic data tools, reporting tools, visualization tools, etc., continue to frustrate efforts to improve interoperability and usage of large amounts of data.

Further, various data management and analysis applications, such as query programming language applications and data analytic applications, may not be compatible for use in a distributed data architecture. As such, data practitioners generally may be required to intervene manually to apply derived formulaic data models to datasets.

Thus, what is needed is a solution for facilitating techniques to optimize data operations applied to datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
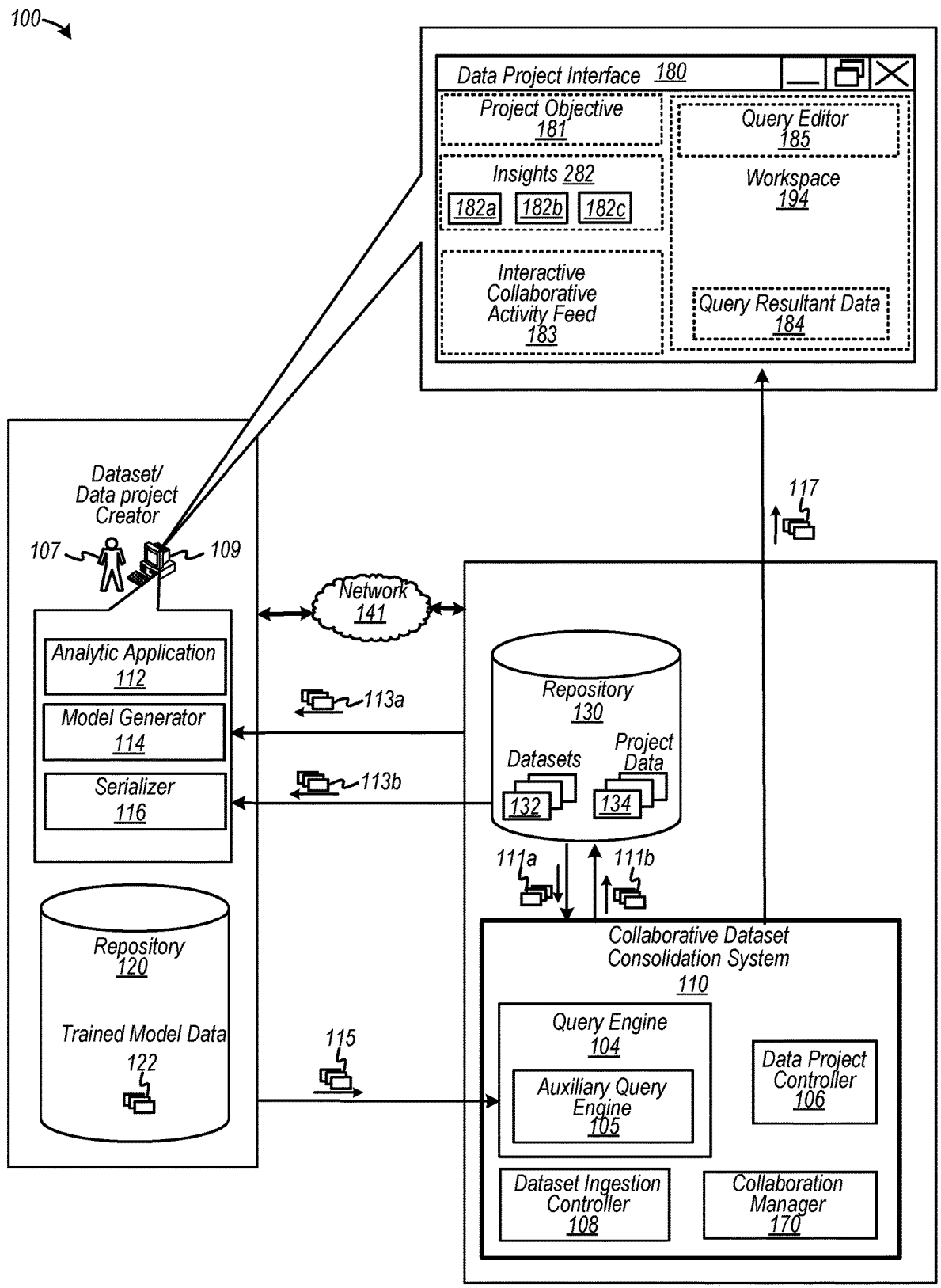
FIG. 1 is a diagram depicting an example of a query engine configured to implement auxiliary query commands to apply at least a subset of a dataset to a predictive data model, according to some embodiments.

FIG. 1 is a diagram depicting an example of a query engine configured to implement auxiliary query commands to apply at least a subset of a dataset to a predictive data model, according to some embodiments. Diagram 100 depicts an example of a collaborative dataset consolidation system 110 that may be configured to consolidate one or more datasets to form collaborative datasets. The collaborative datasets provide, for example, a canonical dataset in association with a collaborative data project directed to analyzing collaborative datasets in view of a particular project objective or purpose. A collaborative dataset, according to some non-limiting examples, is a set of data that may be configured to facilitate data interoperability over disparate computing system platforms, architectures, and data storage devices. Examples of collaborative datasets may include, but are not limited to, data catalogs or any type of repository that is used to aggregate and perform various computing functions on one or more datasets using input, for example, from users, either individually or those in networked collaboration. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets.

Collaborative dataset consolidation system 110 is shown to include a query engine 104, a data project controller 106, a dataset ingestion controller 108, and a collaboration manager 170, and may include other structures and/or functionalities (not shown). Query engine 104, which may be configured to store, modify, and query data in accordance with query commands (or instructions) of a query programming language, may include an auxiliary query engine 105. In this example, auxiliary query engine 105 may be configured to perform auxiliary functions adapted to be compatible with a query programming language. Further, auxiliary query engine 105 may be configured to process auxiliary query commands to supplement a query programming language. In some examples, an auxiliary query command may be compatible with a set of query commands of a query programming language, and auxiliary query engine 105 may be configured to process multiple classes of auxiliary query commands. For example, an auxiliary query command may be compatible with (or may supplement) a structured query language ("SQL"), a SPARQL protocol and RDF query language ("SPARQL"), and the like.

According to some examples, one class of auxiliary query commands may be configured to implement data representing a predictive data model as a query is performed. In operation, auxiliary query engine 105 may be configured to detect an auxiliary query command configured to implement a predictive data model, identify a specific predictive data model, and apply data from or at one or more datasets 132 of repository 130 to a predictive data model to generate resultant data. To illustrate, consider an example in which query engine 104 may be running a query with which auxiliary query engine 105 may detect an auxiliary query command. In some examples, an auxiliary query command may specify an identified predictive data model. In turn, auxiliary query engine 105 may be configured to transmit via a network 141 data 113a representing a request to access the identified predictive data model (e.g., based on an identifier specifying the predictive data model). In the example shown, auxiliary query engine 105 may transmit request data 113a to fetch data representing a predictive data model, such a trained data model 122 stored in repository 120. In response, data 115 representing a predictive data model (or a derivation thereof) may be received into auxiliary query engine 105 to perform a function defined by the predictive data model.

Further to the example of processing the auxiliary query command, auxiliary query engine 105 may be configured to identify data 111a representing one or more datasets 132 of repository 130 based on the auxiliary query command. Moreover, auxiliary query engine 105 may be configured to identify one or more parameters, which, in some examples, may identify subsets of dataset data 111a with which to apply to a predictive data model to generate results. Each subset of dataset data 111a identified by a parameter may relate to a type or data attribute of a dataset (e.g., associated with a column of data of a tabular data format), according to some examples. The resultant data may be stored as data 111b within (or linked to) project data 134, and may be presented as query resultant data 184 in data project interface 180. In some examples, query resultant data 184 may be presented in tabular form, or in graphical form (e.g., in the form of a visualization, such as a bar chart, graph, etc.). In some implementations, a user input (not shown) may accompany query resultant data 184 to open a connector or implement an API to transmit the query results to a third-party (e.g., external) computerized data analysis tool, such as Tableau®. A query may be "ran," or performed, by applying executable commands to a collaborative atomized dataset to generate results of the query in interface portion 194.

Diagram 100 depicts a user 107 being associated with a computing device 109, which may be configured to generate trained model data 122. As shown, computing device 190 may be configured to execute any number of applications to generate a predictive data model. For example, computing device 190 may include one or more analytic applications 112, one or more model generators 114, and one or more serializers 160, among other applications. One or more analytic applications 112 may include applications and/or programming languages configured to perform statistical and data analysis including "R," which is maintained and controlled by "The R Foundation for Statistical Computing" at www(dot)r-project(dot)org, as well as other like languages or packages, including applications that may be integrated with R (e.g., such as MATLAB™, Mathematica™, etc.). Also, other applications, such as Python programming applications, MATLAB™, Tableau® applications, SAS® applications, etc., any of which may be used to perform further analysis, including visualization or other queries and data manipulation to develop, for example, machine learning applications.

One or more model generators 114 may include one or more applications configured to apply machine learning algorithms or deep learning algorithms to generate one or more predictive data models. For example, one or more model generators 114 may be configured to facilitate supervised as well as unsupervised learning, and any may be further configured to implement Bayesian models, support vector machine algorithms, neural network algorithms, linear regression algorithms, etc., as well as clustering algorithms, k-means algorithms, etc. In developing a predictive data model, one or more model generators 114 may be configured to train a model using data 113*b* from datasets 132. Based on an amount of data in datasets 132 (e.g., from hundreds to millions of records, files, or subsets of data), an output (e.g., a value thereof) may be predicted based on any number of specific inputs, as parameters, into a data model. Subsequent to a training process, a trained data model 122 may be referred to a predictive data model.

In some examples, computing device 109 may include applications to provide one or more serializers 116, which may be configured to convert a predictive data model, such as trained data model 122, into a format that facilitates storage or data transmission. In some examples, serializer 116 may be configured to serialize trained model data 122 for transmission as data 115 to query engine 104. Examples of applications to implement serializers 116 include, but are not limited to, a Predictive Model Markup Language ("PMML") application, which is developed and managed by the Data Mining Group (a consortium managed by the Center for Computational Science Research, Inc., of Illinois, USA), an Open Neural Network Exchange format ("ONNX") application, which is managed by the Linux® Foundation of San Francisco, CA, USA, "pickle" application, which is a process of converted a Python object into a byte stream maintained by Python Software Foundation of Fredericksburg, VA, USA, and other equivalent serializing functions and/or applications. According to various examples, query engine 104 and/or collaborative data consolidation system 110 may be configured to implement one or more deserializers (not shown) configured to perform an operation to reconstitute a predictive data model based on the serialized predictive data model. For example, a deserializer may be configured to transform a serialized predictive data model into its original state by performing an inverse serialization process (e.g., reconstructing or extracting objects or other data structures from a stream of bytes or bits).

To generate an auxiliary query command as part of a query, user 107 may cause computing device 109 to receive a user input that, in turn, causes entry of an auxiliary query command into a query editor 185 of a workspace 194 portion of data project interface 180. Entry of an auxiliary query command may supplement entry of normative (e.g., standard) query commands. Therefore, entry of auxiliary queue commands facilitates entry of in situ (e.g., inline) referencing and implementation of output data of predicative data models automatically. Further, execution of an auxiliary query command may return a degree of confidence (e.g., a confidence level) for a value generated as an output of a predictive data model, the value representing a likelihood that, for example, a confidence interval covers or includes a proportion of a population of outcomes. Thus, a query command (e.g., an auxiliary query command) can be configured to return a confidence level or any other statistical representation that expresses an accuracy of a predicted output value from a predictive data model. In view of the foregoing, implementing and executing an auxiliary query command may automatically deploy predictive machine learning algorithm outputs during a query with negligible to no manual access to a predictive data model upon execution of a query, at least in some examples.

Query engine 104 and auxiliary query engine 105 may be configured to implement a query may be implemented as either a relational-based query (e.g., in an SQL-equivalent query language) or a graph-based query (e.g., in a SPARQL-equivalent query language). Further, a query may be implemented as either an implicit federated query or an explicit federated query. In some examples, a query is automatically performed, or run, each time a query is accessed, thereby providing, for example, a latest (or "freshest") query result. As such, any number of users of an organization (e.g., an enterprise) may generate any number of queries that access a predictive data model while running the queries.

Data project controller 106 may be configured to control components of collaborative dataset consolidation system 110 to provision, for example, data project interface 180, as a computerized tool, to facilitate interoperability of canonical datasets with other datasets in different formats or with various external computerized analysis tools (e.g., via application programming interfaces, or APIs), whereby computerized analysis tools may be disposed external to collaborative dataset consolidation system 110. Examples of external computerized analysis tools include statistical and visualization applications. Thus, data project interface 180, as a computerized tool, may be configured to procure, inspect, analyze, generate, manipulate, and share datasets, as well as to share query results (e.g., based on auxiliary query commands) and insights (e.g., conclusions or subsidiary conclusions) among any number of collaborative computing systems (and collaborative users of system 110). In at least some examples, data project interface 180 facilitates simultaneous access to multiple computerized tools, whereby data project interface 180 is depicted in a non-limiting example as a unitary, single interface configured to minimize or negate disruptions due to transitioning to different tools that may otherwise infuse friction in a data project and associated analysis.

Data project interface 180 includes examples of interface portions, such as a project objective portion 181, insights portion 182, and an interactive collaborative activity feed portion 183. Project objective 181 may be configured to facilitate an aim for procuring, configuring, and assessing data for a particular data-driven purpose or objective. Insights 182 may include data representing visualized (e.g., graphical) or textual results as examples of analytic results (including interim results) for a data project. For example, insights 182*a* may provide answers or conclusions, whether final or interim, in report form (e.g., a text file, PDF, etc.). Or, dataset/data project creator 107 may publish insight 182*b* to provide different results of a query, perhaps in graphic form. Another user may generate another insight, such as insight 182*c*. Interactive collaborative activity feed 183 communicates interactions over time with the datasets of a data project to collaborative users, include user 107.

Data project controller 106 may be configured to control functionality of data project interface 180 to enable personnel of different skill levels to engage with data operations of an enterprise. For example, consider a skillset of a user generating a data project that may begin, or "kick off," with a formation of an objective at 130 of a data project with which to guide collaborative data mining and analyzation efforts. In some examples, a project objective may be established by a stakeholder, such as by management personnel of an organization, or any role or individual who may or may not be skilled as a data practitioner. For example, a chief executive officer ("CEO") of a non-profit organization may desire to seek an answer to a technical question that the CEO is not readily able to resolve. The CEO may launch a data project through establishing a project objective 181 to invite skilled data practitioners within the organization, or external to the organization, to find a resolution of a question and/or proffered hypotheses. Further, auxiliary query command enables users of different roles and individual who may or may not be skilled as a data practitioner to have access to underlying, complex machine learning-based models with no need to require access to machine learning-specific applications or algorithms.

Collaboration manager 170 may be configured to monitor updates to dataset attributes and other changes to a data project, and to disseminate the updates, including queries integrating predicative data models in situ, to a community of networked users or participants. Therefore, users, such as user 107, as well as any other user or authorized participant, may receive communications, such as in an interactive collaborative activity feed 183 to discover new or recently-modified dataset-related information in real-time (or near real-time), including new or recently-modified queries that may deploy automatically a machine learning model concurrently (or nearly concurrently) with running a query. Interactive collaborative activity feed 183 also may provide information regarding collaborative interactions with one or more datasets associated with a data project, or with one or more collaborative users or computing devices. As an example, interactive collaborative activity feed 183 may convey one or more of a number of queries that are performed relative to a dataset, a number of dataset versions, identities of users (or associated user identifiers) who have analyzed a dataset, a number of user comments related to a dataset, the types of comments, etc.), and the like. Further, a generated insight may be published into data project interface 180, which, in turn, may cause a notification (i.e., an insight has been generated) may be transmitted via interactive collaborative activity feed 183 to associated collaborative user accounts to inform collaborative users of the availability of a newly-formed insight. Therefore, interactive collaborative activity feed 183 may provide for "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets."

Dataset ingestion controller 108 may be configured to transform, for example, a tabular data arrangement (or any other data format) in which a dataset may be introduced into collaborative dataset consolidation system 110 as another data arrangement (e.g., a graph data arrangement) in a second format (e.g., a graph). Examples of data formats of ingested data include CSV, XML, JSON, XLS, MySQL, binary, free-form, unstructured data formats (e.g., data extracted from a PDF file using optical character recognition), etc., among others. Dataset ingestion controller 108 also may be configured to perform other functionalities with which to form, modify, query and share collaborative datasets according to various examples. In at least some examples, dataset ingestion controller 108 and/or other components of collaborative dataset consolidation system 110 may be configured to implement linked data as one or more canonical datasets with which to modify, query, analyze, visualize, and the like. In some examples, dataset ingestion controller 108 may be configured to detect that an ingested set of data constitutes a predictive data model, and, in response, may store data models in repository 130.

According to some embodiments, a collaborative data format may be configured to, but need not be required to, format a converted dataset into an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, a data arrangement may be represented as a graph, whereby a converted dataset (i.e., an atomized dataset) may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

Note that an ingested dataset including a tabular data arrangement may be converted into a second data arrangement, such as a graph data arrangement. As such, data in a field (e.g., a unit of data in a cell at a row and column) of a table may be disposed in association with a node in a graph (e.g., a unit of data as linked data). A data operation (e.g., a query) may be applied as either a query against a tabular data arrangement (e.g., based on a relational data model) or graph data arrangement (e.g., based on a graph data model, such using RDF). Since equivalent data are disposed in both a field of a table and a node of a graph, either the table or the graph may be used interchangeably to perform queries and other data operations. Similarly, a dataset disposed in one or more other graph data arrangements may be disposed or otherwise mapped (e.g., linked) as a dataset into a tabular data arrangement. Further to diagram 100, dataset ingestion controller 108 may be configured to generate ancillary data or descriptor data (e.g., metadata) that describe attributes associated with each unit of data in the ingested dataset as metadata.

An atomized data point may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations. Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, MD, U.S.A.), and the like.

According to various examples, query engine 104 and/or collaborative data consolidation system 110 may be configured to implement any of analytic applications 112, model generators 114, and serializers 160, among other applications. According to various examples, any of the functionalities and/or structures described in FIG. 1 may be implemented in, or in association with, collaborative dataset consolidation system 110. In at least one implementation, collaborative dataset consolidation system 110 may be implemented using a computing platform provided by data-.world, Inc., of Austin, TX, USA. In view of the foregoing, and in subsequent descriptions, data project interface 180 provides, in some examples, a unified view and an interface (e.g., a single interface) with which to access multiple functions, applications, data operations, and the like, for analyzing, querying, and publicizing multiple collaborative datasets, whereby an auxiliary query command may be implemented in situ. One or more elements depicted in diagram 100 of FIG. 1 may include structures and/or functions as similarly-named or similarly-numbered elements depicted in other drawings, or as otherwise described herein, in accordance with one or more examples.

According to various embodiments, one or more structural and/or functional elements described in FIG. 1, as well as below, may be implemented in hardware or software, or both. Examples of one or more structural and/or functional elements described herein may be implemented as set forth in one or more of U.S. Pat. No. 10,346,429, issued on Jul. 9, 2019, and titled "MANAGEMENT OF COLLABORATIVE DATASETS VIA DISTRIBUTED COMPUTER NETWORKS;" U.S. Pat. No. 10,353,911, issued on Jul. 16, 2019, and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 15/927,006 filed on Mar. 20, 2018, and titled "AGGREGATION OF ANCILLARY DATA ASSOCIATED WITH SOURCE DATA IN A SYSTEM OF NETWORKED COLLABORATIVE DATASETS;" and U.S. patent application Ser. No. 15/985,705, filed on May 22, 2018, and titled "DYNAMIC COMPOSITE DATA DICTIONARY TO FACILITATE DATA OPERATIONS VIA COMPUTERIZED TOOLS CONFIGURED TO ACCESS COLLABORATIVE DATASETS IN A NETWORKED COMPUTING PLATFORM," all of which are herein incorporated by reference in their entirety for all purposes.

Figure 2:
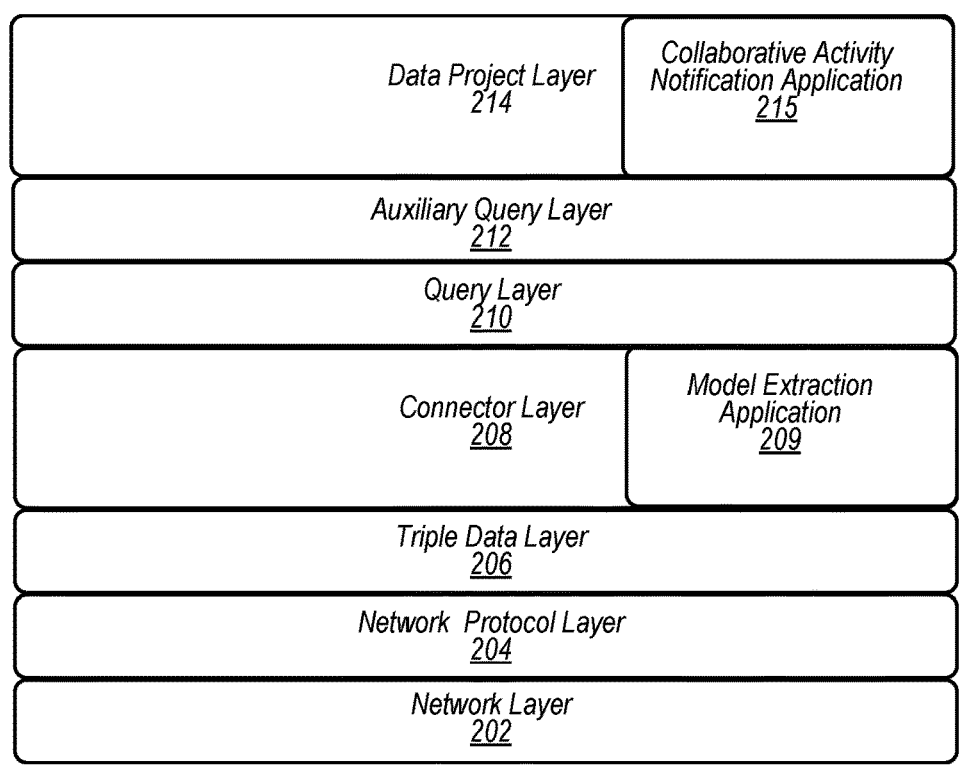
FIG. 2 is a diagram depicting an example of a stack configured to facilitate functionalities of an auxiliary query layer and a data project layer thereon, according to some examples.

FIG. 2 is a diagram depicting an example of a stack configured to facilitate functionalities of an auxiliary query layer and a data project layer thereon, according to some examples. A network protocol 204, such as HTTP (or the like), may be layered upon a network layer 202, which may include IP-based networks and protocols or any other type of network. A triple data layer 206 is illustrative of an exemplary layer in the architecture of software stack 201 at which "atomic" triple data may been converted from the native programmatic and/or formatting language of a query or another query received by a query layer 201. Elements of query layer 201 may be configured to convert data associated with a query into RDF or other forms of "atomic" triples data. As used herein, "atomic" may refer to a common conversion data format that, once converted, can be used to create various types of queries for datasets stored on different, inconsistent, or incongruous databases. Some examples of types of triple formats and protocols that may be used to convert a query include, but are not limited to RDF, SPARQL, R, Spark, among others.

Connector layer 208 may be disposed on triple data layer 206, as shown in stack 201. Connector layer 208 may include instructions and data to implement a data network link connector (e.g., a connector, such as a web data connector), or an integration application including one or more application program interfaces ("APIs") and/or one or more web connectors. Further, connector layer 208 may include a model extraction application 209 that may be configured to extract or otherwise acquire data representing predictive data model. As an example, connector layer 208 may include one or more applications configured to implement a serializer or a deserializer, or both.

Query layer 210, which may be disposed upon connector layer 208, can include executable instructions or commands to facilitate one or more query programming languages, such as a structured query language ("SQL"), a SPARQL protocol and RDF query language ("SPARQL"), and any other query programming language (or variant thereof). Auxiliary query layer 212 may include supplemental executable instructions or auxiliary commands to augment one or more query programming languages (e.g., augment one or more standard query programming languages). In at least one example, a class of auxiliary query commands may be configured to implement data representing a predictive data model inline as a query is performed.

Data project layer 214, which may be disposed upon auxiliary query layer 212, may include executable instructions or commands to implement a data project interface, as a computerized tool, that may be configured to procure, inspect, analyze, generate, manipulate, and share datasets. Collaborative activity notification application 215 may include an application configured to disseminate dataset interactions over a community of datasets and users. Also, collaborative activity notification application 215 may facilitate sharing query results (e.g., based on auxiliary query commands) and insights (e.g., conclusions or subsidiary conclusions), among other things, to any number of collaborative computing systems and associated users.

Figure 3:
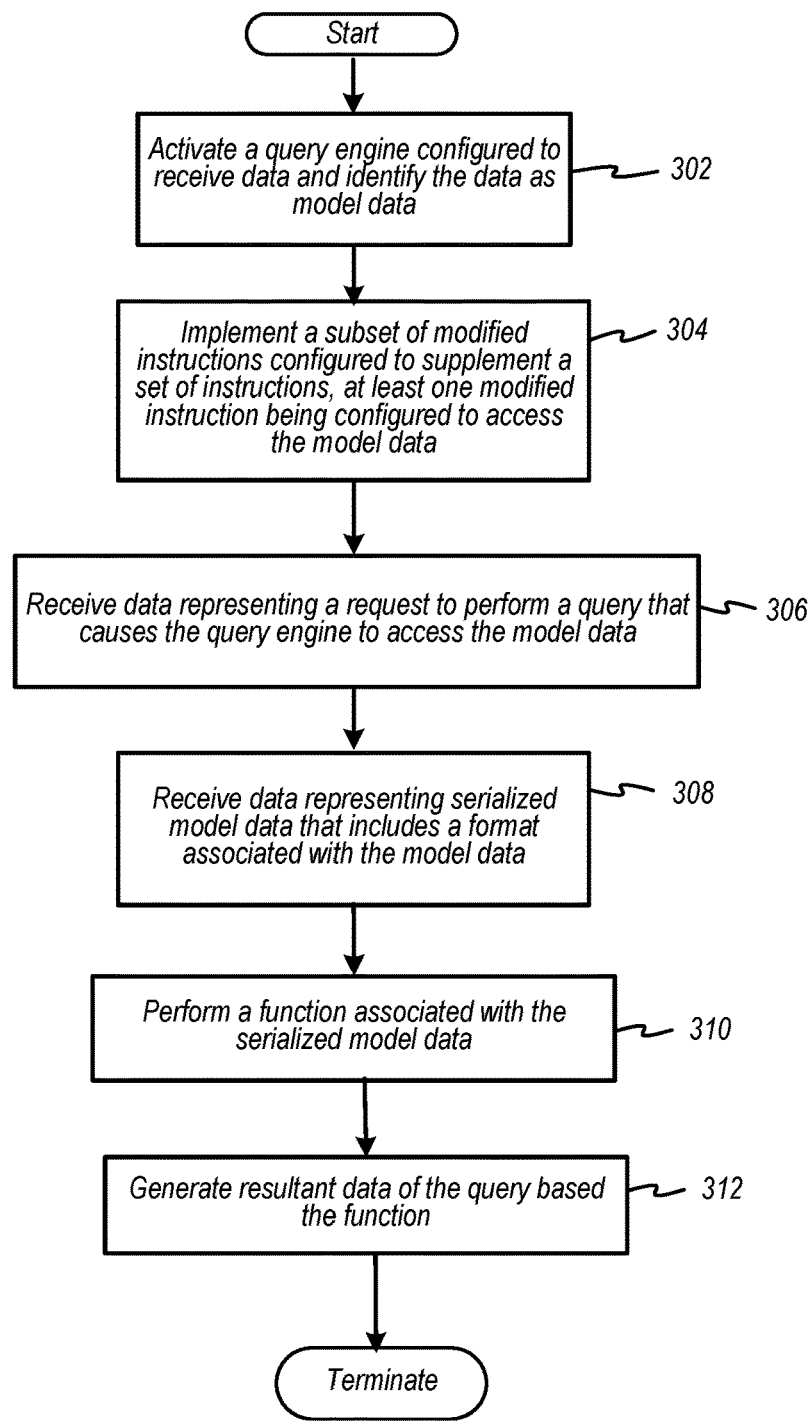
FIG. 3 is a flow diagram depicting an example of implementing a query engine to deploy predictive data models in situ, according to some embodiments.

FIG. 3 is a flow diagram depicting an example of implementing a query engine to deploy predictive data models in situ, according to some embodiments. In some examples, flow diagram 300 may be implemented via computerized tools including a data project interface, which may be configured to initiate and/or execute query instructions to evaluate a data project dataset by invoking application of a predictive data model inline to generating and executing query commands. A query engine implementing an auxiliary query engine, an example of which is depicted in FIG. 1, may be configured to effectuate an example flow of diagram 300. At 302, a query engine may be configured to receive data identified as model data, which may be include data representing a predictive data model. At 304, a subset of auxiliary instructions configured to supplement a set of instructions may be implemented, for example, by a query engine. In some cases, at least one auxiliary instruction (e.g., at least one auxiliary query command) may be configured to access model data as a predictive data model. At 306, data representing a request to perform a query may be received into, for example, a query engine, whereby the query may be configured to cause the query engine to access model data.

At 308, data representing serialized model data may be received or otherwise accessed. In some examples, serialized model data may include a format associated with a model data, whereby serialized model data may be a type of formatted model data. In some examples, a query engine may be configured to deserialize the serialized model data to reconstitute the model data prior to performing a query. Data representing serialized model data may be loaded into a query engine to which data from a dataset may be applied to perform a function inline with execution of an auxiliary query command. In some examples, a serialized model data may be loaded into a query engine responsive to an identifier determined by execution of the at least one auxiliary instruction.

At 310, a function associated with the serialized model data may be performed. Responsive to receiving a query request, one or more datasets with which to perform a function may be accessed. The one or more datasets may be disposed in one or more triple stores or other graph-based data repositories. In some examples, a function call responsive to a query may be performed to fetch data representing serialized model data. At 312, resultant data of a query may be generated based on a function. Performance of a query may generate resultant data based on an identifier that references the serialized model data. Further, generating resulting data at 312 may include receiving a query instruction, such as an auxiliary instruction, that includes one or more parameters and an identifier that references serialized model data. The one or more parameter may identify which of one or more datasets (or subsets thereof) stored in triple stores that may be accessed as inputs into a predictive data model to perform a function associated with an identifier. In some examples, executing instructions to generate resultant data may include applying a subset of one or more datasets (e.g., one or more columns) to inputs of a predictive data model (e.g., serialized model data subsequent to deserialization). The resultant data may be accessed at one or more outputs of the predictive data model. Additionally, data representing a degree of confidence associated with the resultant data may be generated.

Figure 4:
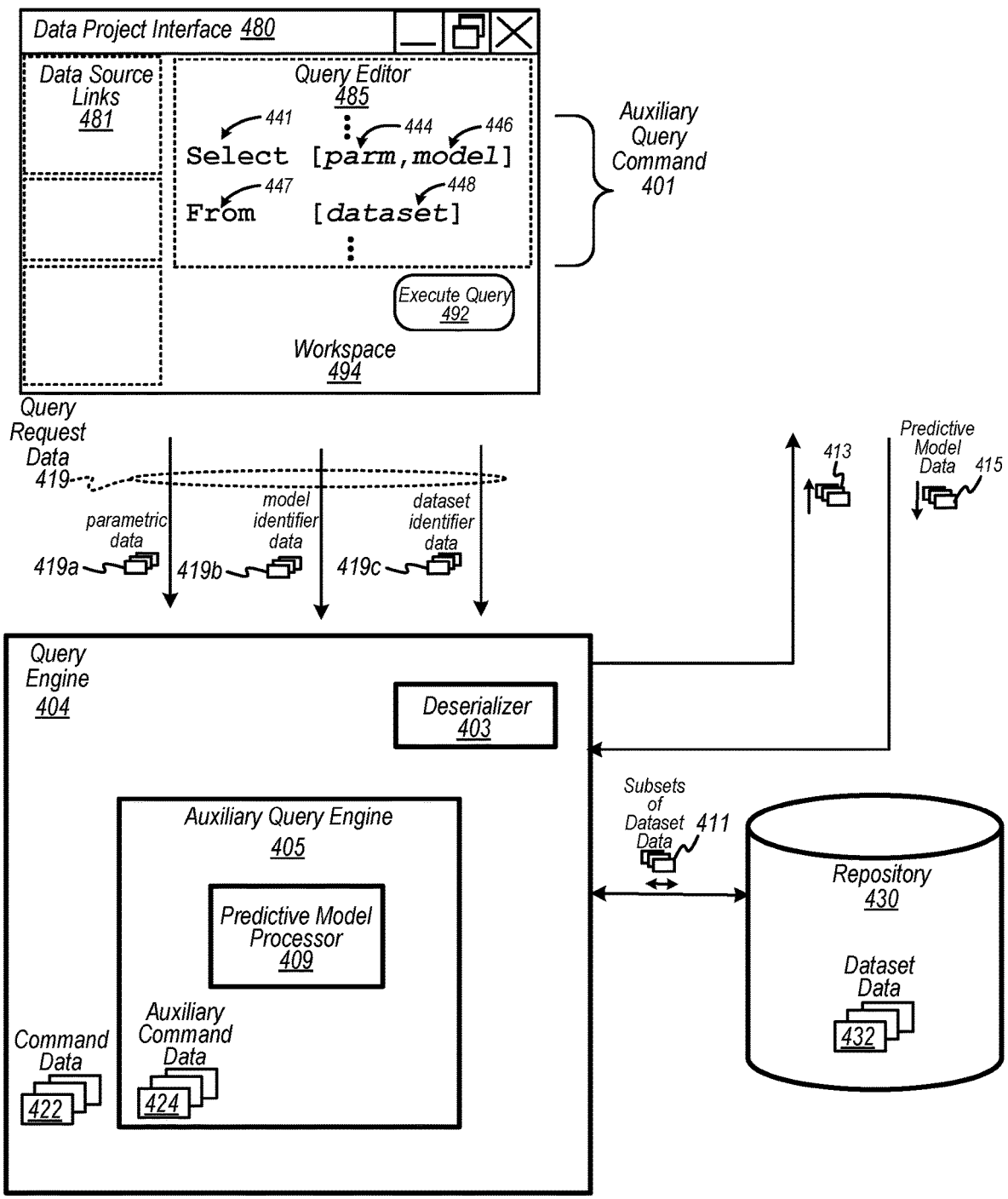
FIG. 4 is a block diagram depicting an example of an auxiliary query command configured to process functionality of a predictive data model, according to some examples.

FIG. 4 is a block diagram depicting an example of an auxiliary query command configured to process functionality of a predictive data model, according to some examples. Diagram 400 depicts a query engine 404 configured to exchange data with a data project interface 480 and a repository 430, according to the example shown. Query engine 404 is shown to include deserializer 403 and an auxiliary query engine 405, which in turn, may include a predictive model processor 409. According to various embodiments, one or more structural and/or functional elements described in FIG. 4, as well as below, may be implemented in hardware or software, or both. One or more elements depicted in diagram 400 of FIG. 4 may include structures and/or functions as similarly-named or similarly-numbered elements depicted in other drawings, or as otherwise described herein or incorporated by reference herein, in accordance with one or more examples.

A query may be entered into a field of a query editor 485. Consider that an auxiliary query command 401 may be entered into query editor 485, as an interface portion of a workspace 494. Standard or normative query commands 422, such as a SELECT statement, that are entered into a query may be validated by query engine 404 with respect to semantics, syntax, and other query language requirements. For example, a normative SELECT statement may be configured to retrieve zero or more rows from one or more database tables or database views. By contrast, an auxiliary query engine 405 may be configured to receive, validate, and process auxiliary query command 401, which may be a non-standard SELECT statement 411. In this example, SELECT statement 441 may include referential data configured to identify parameters ("parm") 444 and an identifier of a predictive data model ("model") 446. In some examples, parameters 444 may identify inputs and outputs of a model with which to apply data and return a result. For example, inputs as parameters may describe subsets of datasets (e.g., columns of datasets) and outputs as parameters may describe one or more subsets of the datasets to be added as resultant data (including confidence level data). For example, output data may be disposed in a new column, and associated degree of confidence level data may be disposed in a new column. Further, the FROM clause 447 may reference one or more datasets ("dataset") 448 from which to extract input data for application to a predictive data model. Data source links 482 may include one or more links as references to datasets with which to select an identifier for dataset 448.

A query may be executed in response to receiving a user input caused by activation of an execute query input 492. To process the query, query engine 404 and auxiliary query engine 405 may receive query data, including query request data 419, which may include parametric data 419a to identify input data, model identifier data 419b may identify a specific predictive data model, and dataset identifier data 419c may identify a specific dataset from which input data may be retrieved and resultant data may be associated. Auxiliary query engine 405 may use query request data 419 to request and receive predictive model data 415, which may be serialized. Deserializer 403 may be configured to reconstitute data 415 representing a serialized predictive data model into its original format or data structure. Auxiliary query engine 405 also may use dataset identifier data 419c to identify dataset data 432 in a repository 430, and parametric data 419a may be used to subsets of dataset data 411 that represents input data to be applied against a predictive data model. In some examples, predictive model data 415 may be loaded into computing memory accessible to auxiliary query engine 405.

Predictive model processor 409 may be configured to implement the identified predictive data model as a function, whereas subsets of dataset data 411 (e.g., selected columnar data) may be applied as inputs to the function. Parametric data 419a may identify an output and associated values that may be monitored with respect to a degree of confidence. Resultant data 413 may be presented in data project interface 480, and may be stored in association with dataset data 432 (e.g., stored as links to a graph).

As an example, consider that dataset 432 includes data for an enterprise that may be disposed in numerous columns and rows of data (e.g., with data values as nodes in a graph). In query editor 485, input parameters include "LTV" and "Start Date," and an output parameter includes a "Churn rate." "LTV," or customer lifetime value, represents a value representing an average revenue that a customer generates before they churn (i.e., cease patronizing a business), whereas "start date" represents an amount of time a customer has been patronizing a business. In this example, churn rate may be a binary value (e.g., yes or no) as to whether a specific customer is predicted to cease patronizing a business. Dataset data 432 may include LTV and Start date data, with which a machine learning algorithm may analyze, develop a data model, train the data model, and generate a predictive data model, which has been accessed as predictive model data 415. As such, predictive model processor 409 may be configured to predict whether a specific customer may churn out (e.g., stop patronizing a business) based on values LTV and Start date, as applied to the predictive data model. The resultant data representing the Churn rate may be stored in dataset data 432, as well as data representing a degree of confidence that the determined Churn rate is accurate.

Figure 5:
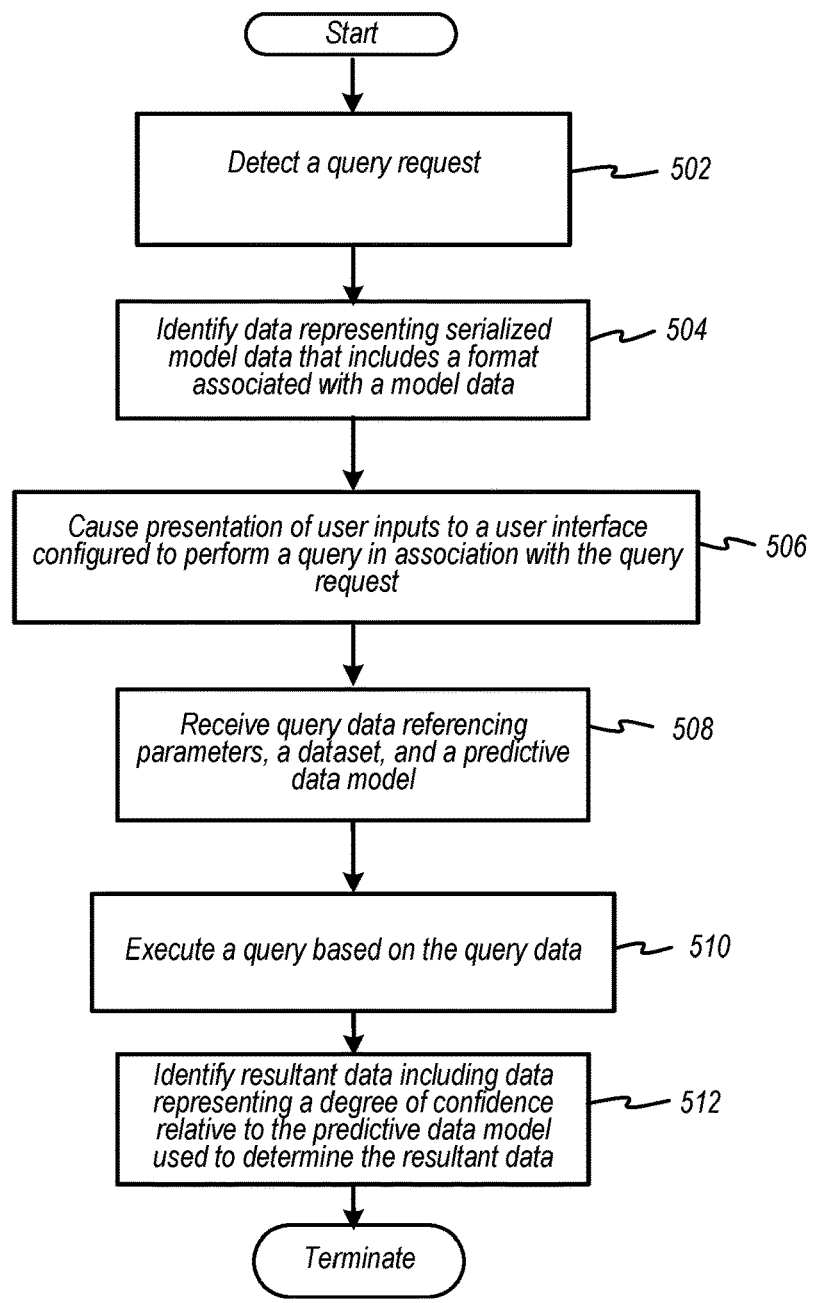
FIG. 5 is a flow diagram depicting an example of implementing an auxiliary query command to deploy predictive data models during query execution, according to some embodiments.

FIG. 5 is a flow diagram depicting an example of implementing an auxiliary query command to deploy predictive data models during query execution, according to some embodiments. In some examples, flow diagram 500 may be implemented via computerized tools including query editor, which may be configured to initiate and/or run a query to evaluate dataset data by applying a predictive data model inline to running a query. An auxiliary query engine, an example of which is depicted in FIG. 4, may be configured to effectuate an example flow of diagram 500. At 502, a query request may be detected.

At 504, data representing serialized model data that includes a format associated with a model data may be identified. In some cases, an auxiliary query command may be implemented responsive, for example, to entry of the auxiliary query command into a query editor. In some examples, an auxiliary query command may be compatible with a set of query commands of a query programming language. For example, an auxiliary query command may be compatible with (or may supplement) a structured query language ("SQL"), a SPARQL protocol and RDF query language ("SPARQL"), and the like. At 506, user inputs may be presented at or to a user interface configured to perform a query in association with to a query request. At 508, query data referencing parameters, a dataset, and a predictive data model may be received.

At 510, a query may be executed, or ran, based on query data. In some examples, one or more memory repositories may be accessed to load dataset data and predictive data model into computational memory to execute a function associated with the predictive data model. For example, either dataset data or predictive data model data, or both, may be accessed in one or more triplestore databases, or other graph-based data stores. Subsets of dataset data may be extracted in accordance to values of the parameters, which, in turn, may be applied to inputs of a predictive data model to execute a function. Resultant data at outputs of the predictive data model may be generated, include one or more degrees of confidence for each result. Further to 510, presentation of a field in which to receive a query command (e.g., to either enter a query into a query editor or run a query) may be presented in a user interface. In at last one example, a user interface may include a data project user interface.

At 512, resultant data may be identified. The resultant data may include data representing a degree of confidence relative to a predictive data model used to determine the resultant data. In some examples, a degree of confidence may be generated for each result outputted from, for example, a predictive data model. In some examples, subsets of resultant data and corresponding data representing degrees of confidence may be formatted and presented in tabular data format (e.g., within a data project interface). In some cases, resultant data and degrees of confidence data may be disposed in a first and second column, respectively.

Figure 6:
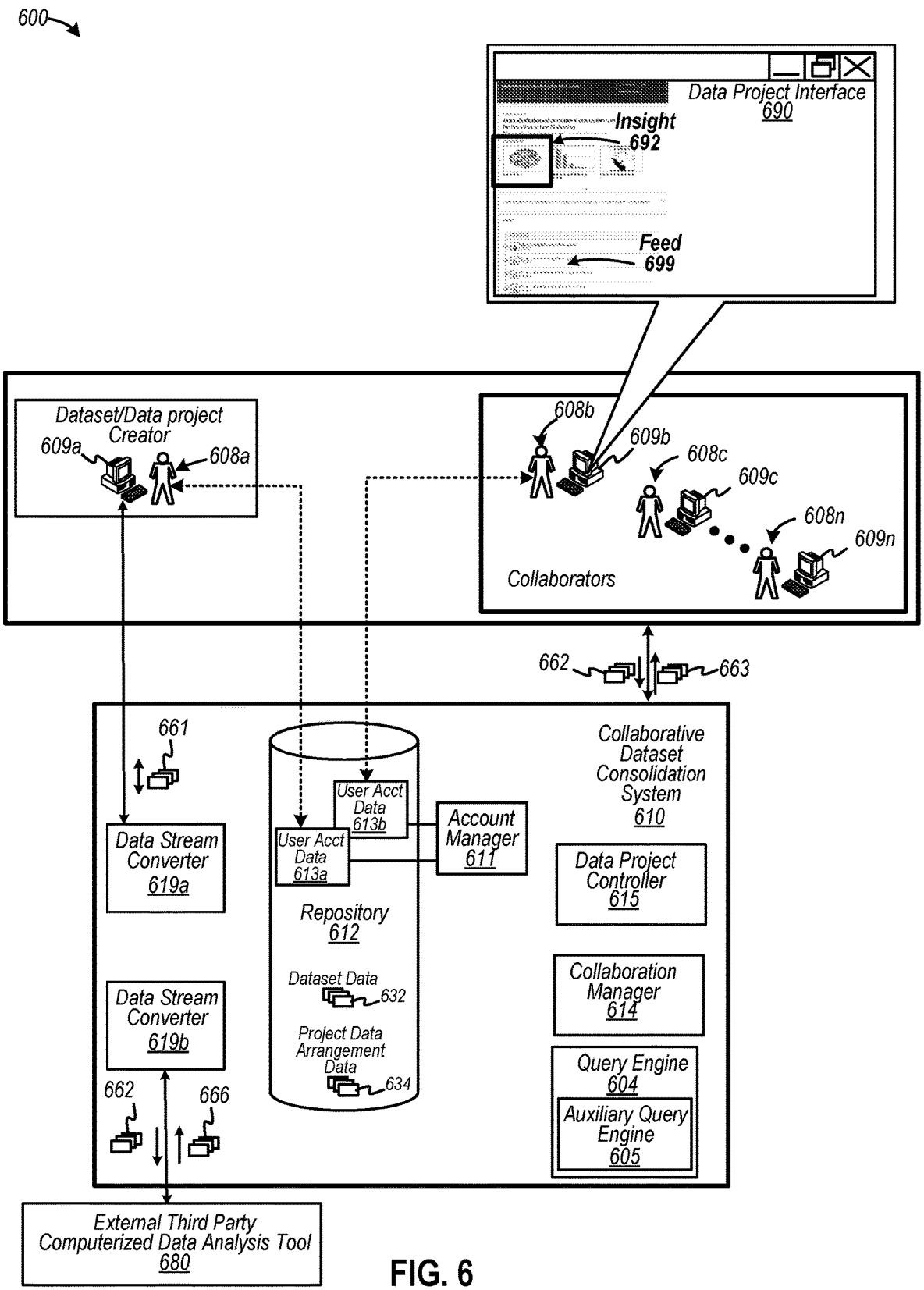
FIG. 6 is a diagram depicting a collaborative dataset consolidation system configured to facilitate implementation of an auxiliary query command by multiple collaborative computing systems, according to some examples.

FIG. 6 is a diagram depicting a collaborative dataset consolidation system including a data stream converter to facilitate implementation of an auxiliary query command by multiple collaborative computing systems, according to some examples. Diagram 600 depicts a collaborative dataset consolidation system 610 including a data repository 612, which includes user account data 613a associated with either a user 608a or a computing device 609a, or both, and account data and 613b associated with either a user 608b or a computing device 609b, or both. User account data 613a may identify user 608a and/or computing device 609a as creators, or "owners," of a dataset or data project accessible by a number of collaborative users 608b to 608n and a number of collaborative computing devices 609b to 609n, any of which may be granted access via an account manager 611 (based on user account data 613a, 613b, ..., and 613n, which is not shown) to access a dataset, create a modified dataset based on the dataset, create an insight (e.g., visualization), and perform queries using auxiliary query commands, or data operations, depending on permission data. Repository 612 also includes dataset data 632 and project data arrangement 634, which is a data arrangement including references or links to data that constitute a data project, which may be accessible at data project interface 690.

Collaborative dataset consolidation system 610 may also include a data project controller 615, a collaboration manager 614, and a query engine 604, which, in turn, may also include an auxiliary query engine 605. One or more elements depicted in diagram 600 of FIG. 6 may include structures and/or functions as similarly-named or similarly-numbered elements depicted in other drawings, or as otherwise described herein, in accordance with one or more examples.

Collaborative dataset consolidation system 610 may also include a data stream converters 619a and 619b. In one example, data stream converter 619a may be implemented as a serializer and/or a deserializer to operate on predictive data model data 661. In another example, data stream converter 619b may be configured to invoke or implement an applications programming interface, or API, a connectors (e.g., a data network link connector or a web data connector), and/or integration applications (e.g., one or more APIs and one or more data connectors) to access data 662 and 666 via a network with an external third-party computerized data analysis tool 680, such as a Tableau® application.

To continue with the example shown in FIG. 6, consider that user 608a may perform a query including an auxiliary query command via computing device 609a at collaborative dataset consolidation system 610, which may generate a notification via an interactive collaborative activity feed 699, whereby any of a number of collaborative enterprise users 608b to 608n and any of a number of collaborative enterprise computing devices 609b to 609n may receive a notification that newly-formed query results are available via activity feed data 699. As such, a qualified collaborator, such as computing device 609b, may generate a query request 662 via a network to access a dataset 632 responsive to receiving the notification of the newly-formed query results. In some examples, either collaborative user 608b or collaborative computing device 609b may be configured to access third-party computerized data analysis tool 680 to review, modify, query, or generate an insight 692 via user account data 613a and 613b. In some examples, either collaborative user 608b or collaborative computing device 609b need not have credentials, and need not be authorized to access external third-party computerized data analysis tool 680. However, either collaborative user 608b or collaborative computing device 609b may access external third-party computerized data analysis tool 680 via authorized user account data 613a via account manager 611 to generate, for example, a query using an auxiliary query command to establish a modified insight 699, or to perform any other data operation.

Therefore, a collaborative user 608b may also generate a query implementing an auxiliary query command, whereby the query may access a predictive data model in situ to provide a supplement dataset 632 with data, which, in turn, generates data 663 as insight 692 in data project interface 690. Thus, auxiliary query engine 605 enables users of different skill sets, roles, and experience levels, to collaboratively use enterprise data. Collaboration among users via collaborative user accounts (e.g., data representing user accounts for accessing a collaborative dataset consolidation system) and formation of collaborative datasets therefore may expedite analysis of data to drive toward resolution or confirmation of a hypothesis based on up-to-date information provided by an interactive collaborative activity feed.

Figure 7:
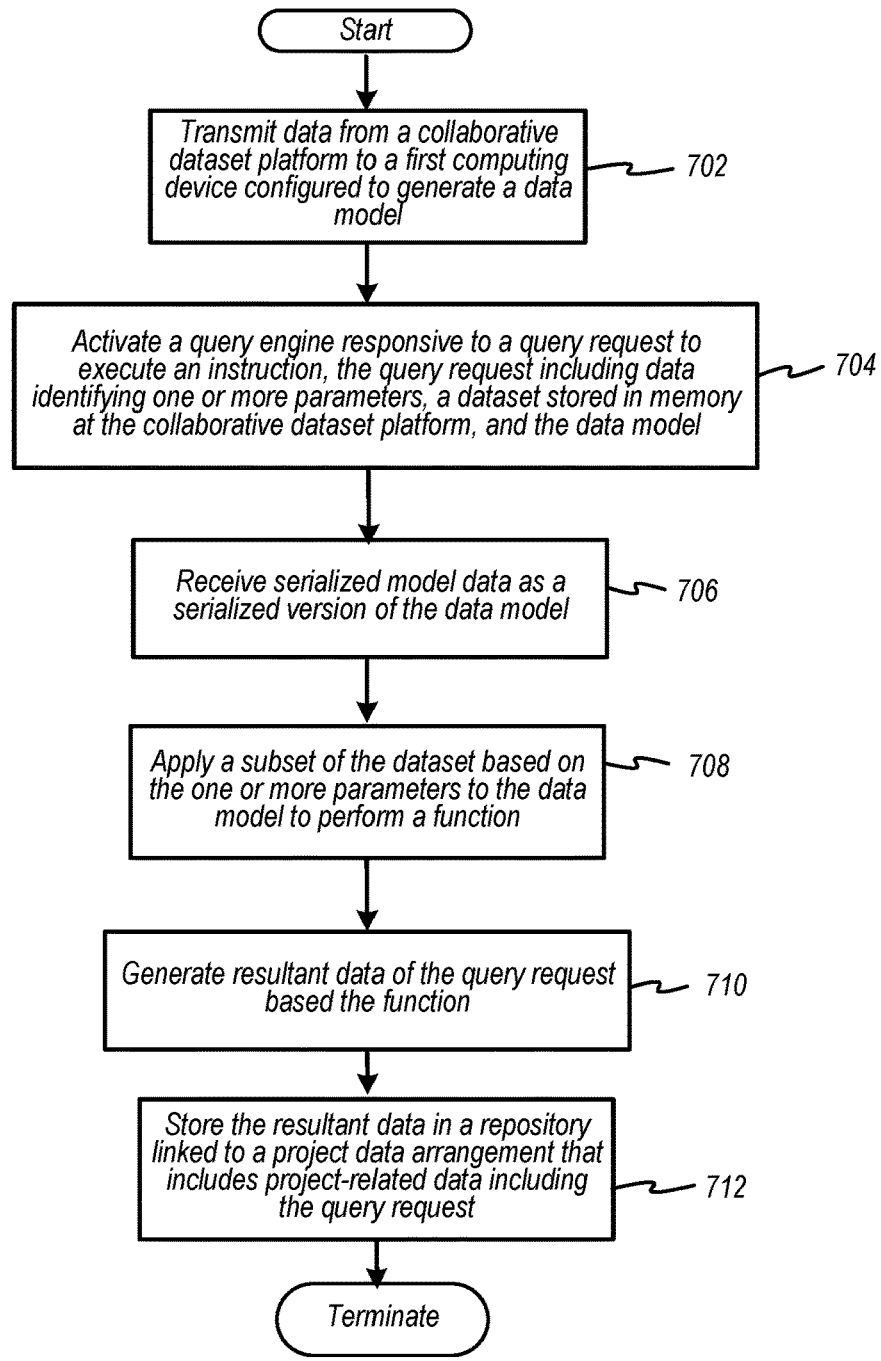
FIG. 7 is a flow diagram depicting an example of implementing an auxiliary query command collaboratively to redeploy predictive data models during requests to run queries, according to some embodiments.

FIG. 7 is a flow diagram depicting an example of implementing an auxiliary query command collaboratively to redeploy predictive data models during requests to run queries, according to some embodiments. In some examples, flow diagram 700 may be implemented via a user interface to initiate and/or run multiple queries originating from multiple users (or user accounts) using a predictive data model in situ to developing or running a query. One or more structures and/or functionalities of FIG. 6 may be configured to implement a flow of diagram 700.

At 702, data from a collaborative dataset platform may be transmitted to a computing device configured to generate and/or train model data (e.g., a predictive data model). The computing device may be disposed externally to a collaborative dataset platform, and may be associated with data representing a user account (e.g., a first user account). In some examples, transmission of the data may be transmitted via, for example, a data network link connector (e.g., a connector, such as a web data connector), or an integration application including one or more application program interfaces ("APIs") and/or one or more web connectors.

At 704, a query engine may be activated responsive to a query request to execute an instruction. The query request may include data identifying one or more parameters, a dataset stored in memory at the collaborative dataset platform, and a data model.

At 706, serialized model data may be received as a serialized version of a data model. Serialized model data may be derived from data representing a machine learning algorithm. In some examples, a request to fetch serialization model data (e.g., responsive to running a query) may be transmitted via, for example, a data network link connector (e.g., a connector, such as a web data connector), or an integration application including one or more application program interfaces ("APIs") and/or one or more web connectors. Also, a data network link may be configured to receive a type of formatting used to serialize (and deserialize) predictive model data.

At 708, a subset of the dataset may be applied to, for example, a predictive model based on one or more parameters to perform a function. In some instances, serialized model data may be deserialize to provide (e.g., reconstitute) the data model at a query engine.

At 710, resultant data of a query request may be generated based the function. In some examples, resultant data may be generated at outputs of a data model, including data representing a degree of confidence. The degree of confidence may be presented in a data project interface. Further to 710, generation of resultant data may be detected, and, in response, a subset of collaborative computing devices (or user accounts) linked to a project data arrangement may be identified. Subsequently, an electronic notification may be generated for transmission via, for example, an activity feed to the subset of collaborative computing devices.

At 712, resultant data may be stored in a repository linked to a project data arrangement that includes project-related data including a query request and its results. In some examples, access to resultant data may be facilitated by a second computing device (e.g., associated with a second user account). Further, a query engine may be activated to perform another query. A subsequent query may include data identifying at least one parameter, a dataset, and a predicted data model, whereby a request to fetch serialized model data may be transmitted. The query, in turn, may generate other resultant data based a function of data model. In one example, a first computing device (e.g., associated with a first user account) and a second computing device (e.g., associated with the second user account) may be associated with enterprise-related data of an enterprise.

Figure 8:
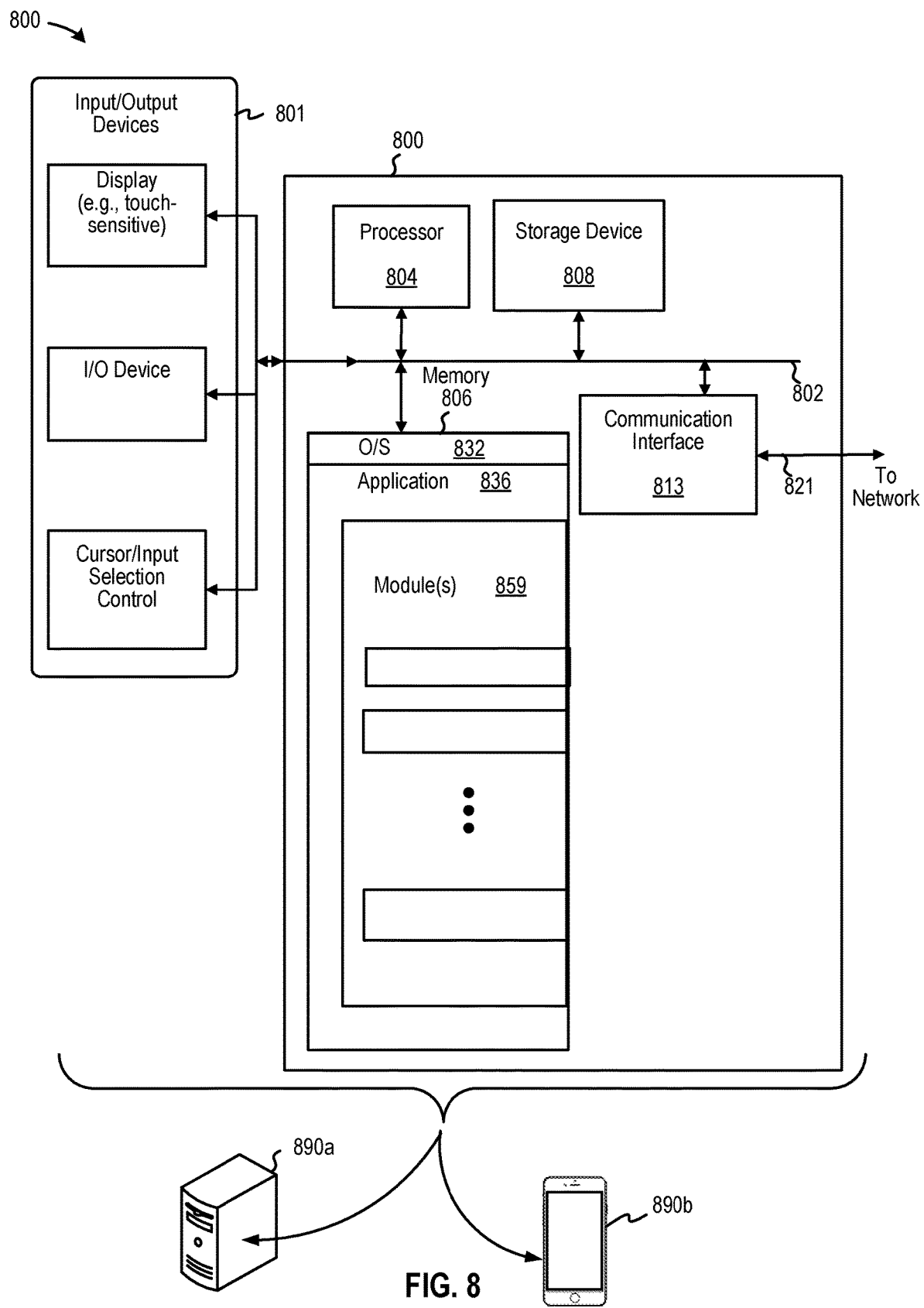
FIG. 8 illustrates examples of various computing platforms configured to provide various functionalities to any of one or more components of a collaborative dataset consolidation system, according to various embodiments.

FIG. 8 illustrates examples of various computing platforms configured to provide various functionalities to any of one or more components of a collaborative dataset consolidation system, according to various embodiments. In some examples, computing platform 800 may be used to implement computer programs, applications, methods, processes, algorithms, or other software, as well as any hardware implementation thereof, to perform the above-described techniques.

In some cases, computing platform 800 or any portion (e.g., any structural or functional portion) can be disposed in, or distributed among, any device, such as a computing device 890a, mobile computing device 890b, and/or a processing circuit in association with initiating the formation of collaborative datasets, as well as analyzing datasets via user interfaces and user interface elements, according to various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache (which may be implemented in RAM 806 or other portions of computing platform 800), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store atomized datasets, including, but not limited to triplestores, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD, LED, or OLED displays, and other I/O-related devices.

Note that in some examples, input-and-output devices 801 may be implemented as, or otherwise substituted with, a user interface in a computing device associated with a user account identifier in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. In the example shown in FIG. 8, system memory 806 may include any number of modules 859, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 859 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 859 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, modules 859 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to a computer program, software, program, firmware, or any other term (e.g., engine) that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, SPARQL, MySQL, NoSQL, DynamoDB™, etc. Also applicable are computer programming languages and formats similar or equivalent to those developed by data facility and computing providers such as Amazon® Web Services, Inc. of Seattle, Washington, FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS").

Further, references to databases, data structures, or any type of data storage facility may include any embodiment as a local, remote, distributed, networked, cloud-based, or combined implementation thereof. For example, social networks and social media (hereafter "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering, content sharing, or like purposes. Data may be generated in various formats such as text, audio, video (including three dimensional, augmented reality ("AR"), and virtual reality ("VR"), or others, without limitation, for use on social networks, social media, and social applications (hereafter "social media") such as Twitter® of San Francisco, California, Snapchat® as developed by Snap® of Venice, California, Messenger as developed by Facebook®, WhatsApp®, or Instagram® of Menlo Park, California, Pinterest® of San Francisco, California, LinkedIn® of Mountain View, California, and others, without limitation or restriction.

In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:
1. A method comprising:
   accessing, by a query engine, subsets of dataset data from a plurality of data repositories;
   applying, by the query engine, the subsets of dataset as input data to model generator applications, each model generator application configured to apply one or more machine learning algorithms or deep learning algo- rithms to train a predictive data model to predict degrees of confidence data as resultant output data;

associating, by the query engine, the predicted data model to an in-situ auxiliary query command;

causing access via a network to data representing one or more portions of an application stack distributed at one or more computing cloud-based resources, the one or more portions of the application stack configured to implement computerized tools to automatically deploy predictive data models based on in-situ auxiliary query commands; and identifying via the network a request to perform a query, the one or more portions of the application stack configured to perform data operations including:
  detecting a query request associated with the query including the in-situ auxiliary query command, the in-situ auxiliary query command being configured to implement the predictive data model;
  identifying data representing the predictive data model for transmission to a query layer of the application stack;
  serializing the predictive data model for transmission as a serialized predictive data model into one or more byte or bit streams;
  causing presentation of user inputs to a user interface configured to perform the query responsive in association with the query request;
  receiving query data referencing parameters, a dataset, and the predictive data model;
  executing one or more queries based on the query associated with data configured to access at least a portion of a graph data arrangement being formatted as triple-based data;
  identifying resultant data including data representing a degree of confidence relative to the predictive data model used to determine the resultant data;
  formatting subsets of the resultant data and corresponding data representing degrees of confidence in tabular data format; and
  causing presentation of the tabular data format at the user interface.

2. The method of claim 1, further comprising:
accessing one or more memory repositories to load the dataset data and the predictive data model into computational memory to execute a function associated with the predictive data model.

3. The method of claim 2, wherein accessing the one or more memory repositories comprises:
accessing one or more triplestore databases.

4. The method of claim 2, further comprising:
extracting queried dataset data based on the query in accordance with the parameters; and
applying the queried dataset data to inputs of the predictive data model to execute the function.

5. The method of claim 4, further comprising:
generating the resultant data at outputs of the predictive data model; and
generating the data representing the degree of confidence for each result.

6. The method of claim 1, wherein causing the presentation of the user inputs comprises:
implementing an auxiliary query command.

7. The method of claim 1, wherein executing the query comprises:
causing presentation of a field in which to receive a query command.

8. The method of claim 7, wherein the query command is a structured query language ("SQL") statement.

9. The method of claim 7, wherein the query command is a SPARQL protocol and RDF query language ("SPARQL") statement.

10. A system comprising:
a memory including executable instructions of one or more applications; and
a processor, responsive to executing the instructions, is configured to:
  access, by a query engine, subsets of dataset data from a plurality of data repositories;
  apply, by the query engine, the subsets of dataset as input data to model generator applications, each model generator application configured to apply one or more machine learning algorithms or deep learning algorithms to train a predictive data model to predict degrees of confidence data as resultant output data;
  associate, by the query engine, the predicted data model to an in-situ auxiliary query command;
  cause access via a network to data representing one or more portions of an application stack distributed among computing cloud-based resources, the one or more portions of the application stack configured to implement computerized tools to automatically deploy predictive data models based on in-situ auxiliary query commands; and
  identify via the network a request to perform a query, the one or more portions of the application stack configured to perform data operations, the processor further configured to:
    detect a query request associated with the query including the in-situ auxiliary query command, the in-situ auxiliary query command being configured to implement the predictive data model;
    identify data representing the predictive data model for transmission to a query layer of the application stack, the predictive data model associated with the in-situ auxiliary query command;
    serialize the predictive data model for transmission as a serialized predictive data model into one or more byte or bit streams;
    cause presentation of user inputs to a user interface configured to perform the query responsive in association with the query request;
    receive query data referencing parameters, a dataset, and the predictive data model;
    execute one or more queries based on the query associated with data configured to access at least a portion of a graph data arrangement being formatted as triple-based data;
    identify resultant data including data representing a degree of confidence relative to the predictive data model used to determine the resultant data;
    format subsets of the resultant data and corresponding data representing degrees of confidence in tabular data format; and
    cause presentation of the tabular data format at the user interface.

11. The system of claim 10 wherein a subset of the instructions further causes the processor to:
access one or more memory repositories to load the dataset data and the predictive data model into computational memory to execute a function associated with the predictive data model.

12. The system of claim 11 wherein a subset of the instructions further causes the processor to:
   access one or more triplestore databases.

13. The system of claim 11 wherein a subset of the instructions further causes the processor to:
   extract queried dataset data in accordance with the parameters; and
   apply the queried dataset data to inputs of the predictive data model to execute the function.

14. The system of claim 13 wherein a subset of the instructions further causes the processor to:
   generate the resultant data at outputs of the predictive data model; and
   generate the data representing the degree of confidence for each result.

15. The system of claim 10 wherein a subset of the instructions further causes the processor to:
   implement an auxiliary query command.

16. The system of claim 15 wherein a subset of the instructions further causes the processor to:
   cause presentation of a field in which to receive a query command.

17. The system of claim 16 wherein the query command is a structured query language ("SQL") statement.

18. The system of claim 16, wherein the query command is a SPARQL protocol and RDF query language ("SPARQL") statement.

\* \* \* \* \*